United States Patent
Kataoka et al.

(10) Patent No.: US 10,521,414 B2
(45) Date of Patent: Dec. 31, 2019

(54) COMPUTER-READABLE RECORDING MEDIUM, ENCODING METHOD, ENCODING DEVICE, RETRIEVAL METHOD, AND RETRIEVAL DEVICE

(71) Applicant: FUJITSU LIMITED, Kawasaki-shi, Kanagawa (JP)

(72) Inventors: Masahiro Kataoka, Kamakura (JP); Ryo Matsumura, Numazu (JP); Takaki Ozawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 478 days.

(21) Appl. No.: 15/490,210

(22) Filed: Apr. 18, 2017

(65) Prior Publication Data
US 2017/0300491 A1 Oct. 19, 2017

(30) Foreign Application Priority Data
Apr. 18, 2016 (JP) ................. 2016-083168

(51) Int. Cl.
G06F 16/00 (2019.01)
G06F 16/22 (2019.01)
G06F 16/23 (2019.01)

(52) U.S. Cl.
CPC ........ *G06F 16/2255* (2019.01); *G06F 16/235* (2019.01)

(58) Field of Classification Search
CPC .. G06F 16/2255; G06F 16/235; G06F 16/134; G06F 16/22; G06F 16/31; G06F 16/41; G06F 16/61; G06F 16/71; G06F 16/81; G06F 16/901
See application file for complete search history.

(56) References Cited

U.S. PATENT DOCUMENTS

| | | | |
|---|---|---|---|
| 5,237,678 A * | 8/1993 | Kuechler | G06F 16/284 |
| 6,003,043 A | 12/1999 | Hatakeyama et al. | |
| 9,514,146 B1 * | 12/2016 | Wallace | G06F 16/24561 |
| 10,409,866 B1 * | 9/2019 | Cheng | G06F 16/951 |

(Continued)

FOREIGN PATENT DOCUMENTS

| | | |
|---|---|---|
| JP | 8-30633 | 2/1996 |
| JP | 10-240754 | 9/1998 |

(Continued)

OTHER PUBLICATIONS

Kesuke Nishida "WEB+DB PRESS plus series Technology underlining Google The inner world of giant system", Gijutsu-Hyohron Co., Ltd., Apr. 2008, 24 Pages (with English Translation).

(Continued)

*Primary Examiner* — Noosha Arjomandi
(74) *Attorney, Agent, or Firm* — Xsensus LLP

(57) ABSTRACT

An encoding device 100 encodes a target file by using a static dictionary 121 and a dynamic dictionary 122. The encoding device 100 generates index information of the target file by folding a file axis and a word axis of the target file utilizing base numbers, respectively, the index information indicates presence information of words registered in the static dictionary 121 and the dynamic dictionary 122. The encoding device 100 generates, when the target file is updated, the difference information indicating difference of the index information with respect to the file axis direction or the word axis direction.

5 Claims, 22 Drawing Sheets

(56) References Cited

U.S. PATENT DOCUMENTS

| | | | | |
|---|---|---|---|---|
| 2006/0047719 A1* | 3/2006 | Hershkovich | ....... | G06F 16/2272 |
| 2007/0130112 A1* | 6/2007 | Lin | ......... | G06F 16/41 |
| 2009/0216740 A1* | 8/2009 | Ramakrishnan | .... | G06F 16/3343 |
| 2009/0292679 A1* | 11/2009 | Ganesh | ......... | G06F 16/00 |
| 2009/0300007 A1* | 12/2009 | Hiraoka | ......... | G06F 16/93 |
| 2012/0330964 A1* | 12/2012 | Baude | ......... | G06F 16/2272 |
| | | | | 707/741 |
| 2015/0363467 A1* | 12/2015 | Cao | ......... | G06F 16/28 |
| | | | | 707/719 |
| 2016/0313989 A1* | 10/2016 | Chen | ......... | G06F 8/65 |
| 2017/0235811 A1* | 8/2017 | McKenna | ......... | G06F 16/9014 |
| | | | | 707/737 |
| 2019/0026491 A1* | 1/2019 | Telford | ......... | G06F 21/6254 |

FOREIGN PATENT DOCUMENTS

| | | |
|---|---|---|
| JP | 10-261969 | 9/1998 |
| WO | WO 2013/038527 A1 | 3/2013 |

OTHER PUBLICATIONS

Koji Sekiguchi "Introduction to Apache Lucene Construction Java open source full-text search system", Gijutsu-Hyohron Co., Ltd., Jun. 2006, 49 Pages (with English Translation).

Extended European Search Report dated Dec. 21, 2017 in Patent Application No. 17166790.0, 8 pages.

Andrzej Bialecki, et al., "Apache Lucene 4" Retrieved from the Internet: URL:http://opensearchlab.otago.ac.nz/paper_10.pdf, XP55327756, Aug. 16, 2012, pp. 17-24.

\* cited by examiner

DYNAMIC DICTIONARY D0

BUFFERING UNIT D1

| 0 | 10 | 20 |
|---|---|---|
| Sherlock △ LONDON △ (Mickey △) | | |

ADDRESS TABLE D2

| DYNAMIC CODE | STORAGE POSITION | DATA LENGTH | EXTERNAL DICTIONARY ID | WORD CODE |
|---|---|---|---|---|
| A000h | 0 | 9 | 31 | CE0003h |
| A001h | 9 | 7 | 22 | CC0977h |
| A002h | 16 | 6 | 53 | CD0010h |
| A003h | 22 | | | |
| ⋮ | | | | |

A002h

COMPUTER-READABLE RECORDING MEDIUM, ENCODING METHOD, ENCODING DEVICE, RETRIEVAL METHOD, AND RETRIEVAL DEVICE

CROSS-REFERENCE TO RELATED APPLICATION(S)

This application is based upon and claims the benefit of priority of the prior Japanese Patent Application No. 2016-083168, filed on Apr. 18, 2016, the entire contents of which are incorporated herein by reference.

FIELD

The embodiments discussed herein are related to an computer-readable recording medium, an encoding method, an encoding device, a retrieval method, and a retrieval device.

BACKGROUND

There is known a technology that generates index information indicating, when compressing a plurality of files, which of the files includes predetermined character information (for example, see Patent Literature 1). The index information is used as an index indicating whether or not each of the plurality of files includes character information to be retrieved. The character information means character strings in which, for example, one-gram character codes are concatenated.

On the other hand, there is known a technology that generates pointer table-type index information associated with words (for example, see Non-Patent Literature 1). This technology will be explained with reference to FIG. 1. FIG. 1 is a diagram illustrating a reference example of a pointer table-type index generating process. As illustrated in FIG. 1, this technology extracts words from each document file, generates index information associated with a corresponding document ID, word IDs, and appearance positions thereof, collects pieces of the index information, and sorts the collected pieces of index information on the basis of the word IDs. Thus, the index information is converted into a transposition index that associates the document IDs and the appearance positions with each other on the basis of the word IDs.

Patent Literature 1: W/O 2013/038527
Patent Literature 2: Japanese Laid-open Patent Publication No. 10-261969
Patent Literature 3: Japanese Laid-open Patent Publication No. 08-030633
Patent Literature 4: Japanese Laid-open Patent Publication No. 10-240754
Non-Patent Literature 1: NISHIDA KESUKE: "Google wo Sasaeru Gijutsu", Apr. 25, 2008, KUBAUHIKI KAISHA GIJUTSU HYOURONSHA
Non-Patent Literature 2: SEKIGUCHI KOJI: "ApacheLucene Nyumon", Jun. 25, 2006, KUBAUHIKI KAISHA GIJUTSU HYOURONSHA However, there exists a problem that index information indicating which of the plurality of files includes a predetermined word is not able to be easily updated in accordance with the update of any file.

For example, the index information generated by the technology is index information about character information, which generates the index information indicating which of the plurality of files includes predetermined character information, and basically is not index information about words. Because a basic part of the index is compressed but an update part to be added in accordance with the update of any file is not compressed, maintenance of regions is needed in accordance with the enlargement of an index size. Therefore, this technology is not able to easily update, in accordance with the update of any file, the index information indicating which of the plurality of files includes a predetermined word.

On the other hand, in a conventional technology that generates a pointer table-type index information that is associated with words, words included in one document file differ from words included in another document file. As a result, when any document file is updated, a new word or an unknown word can be included in the document file in some cases, and thus a generating process, a collection process, a sort process, and a transposition process of the index are repeated again. Therefore, this conventional technology is not able to easily update the pointer table-type index based on word IDs of words included in the plurality of document files.

SUMMARY

According to an aspect of an embodiment, a non-transitory computer readable recording medium stores therein an encoding program. The program causes a computer to execute a process. The process includes encoding a target file by using a static dictionary and a dynamic dictionary. The process includes generating index information of the target file by folding a file axis and a word axis of the index information of the target file utilizing base numbers, respectively, the index information indicating presence information of words registered in the static dictionary and the dynamic dictionary in the target file. The process includes generating difference information of the index information when the target file is update, the difference information indicating difference of the index information with respect to the file axis direction or the word axis direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. In addition, the disclosed technology is not limited to the embodiments described below.

[a] First Embodiment

One Example of Bitmap-Type Index Updating Process

Figure 1:
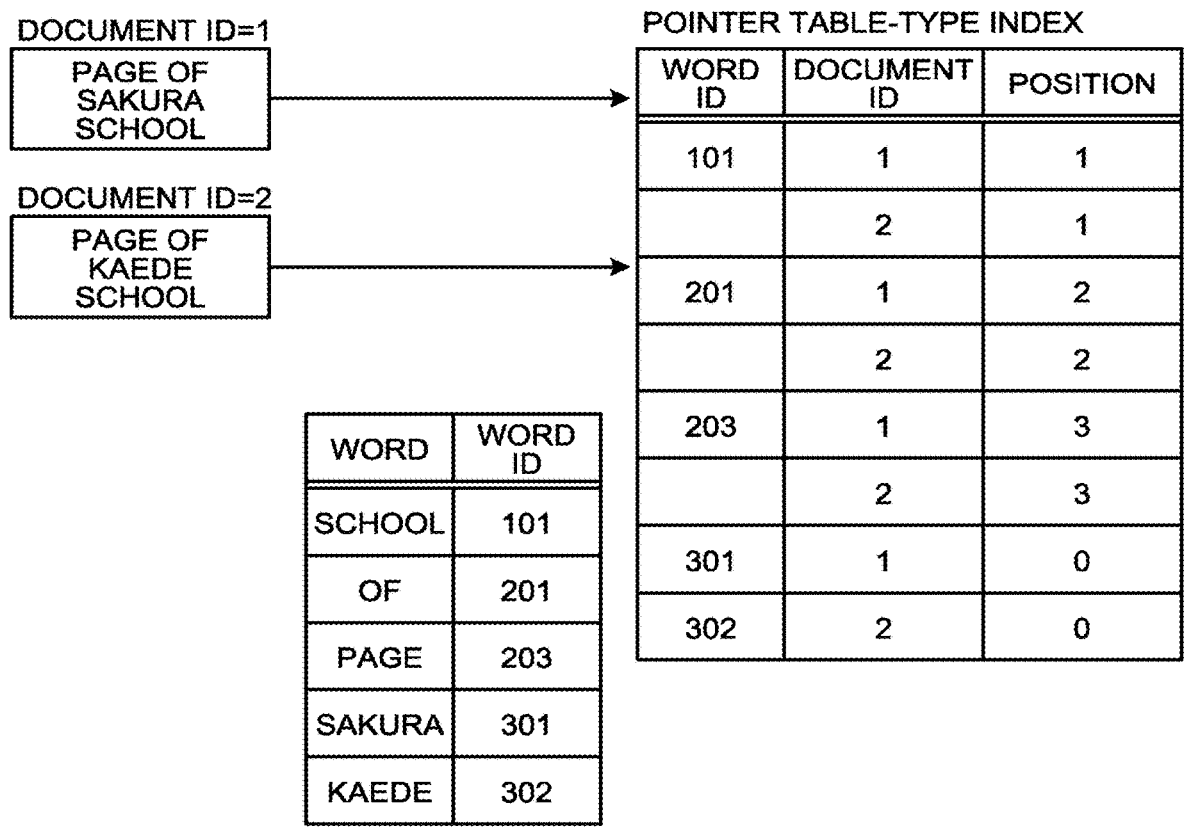
FIG. 1 is a diagram illustrating a reference example of a pointer table-type index generating process.
Figure 2:
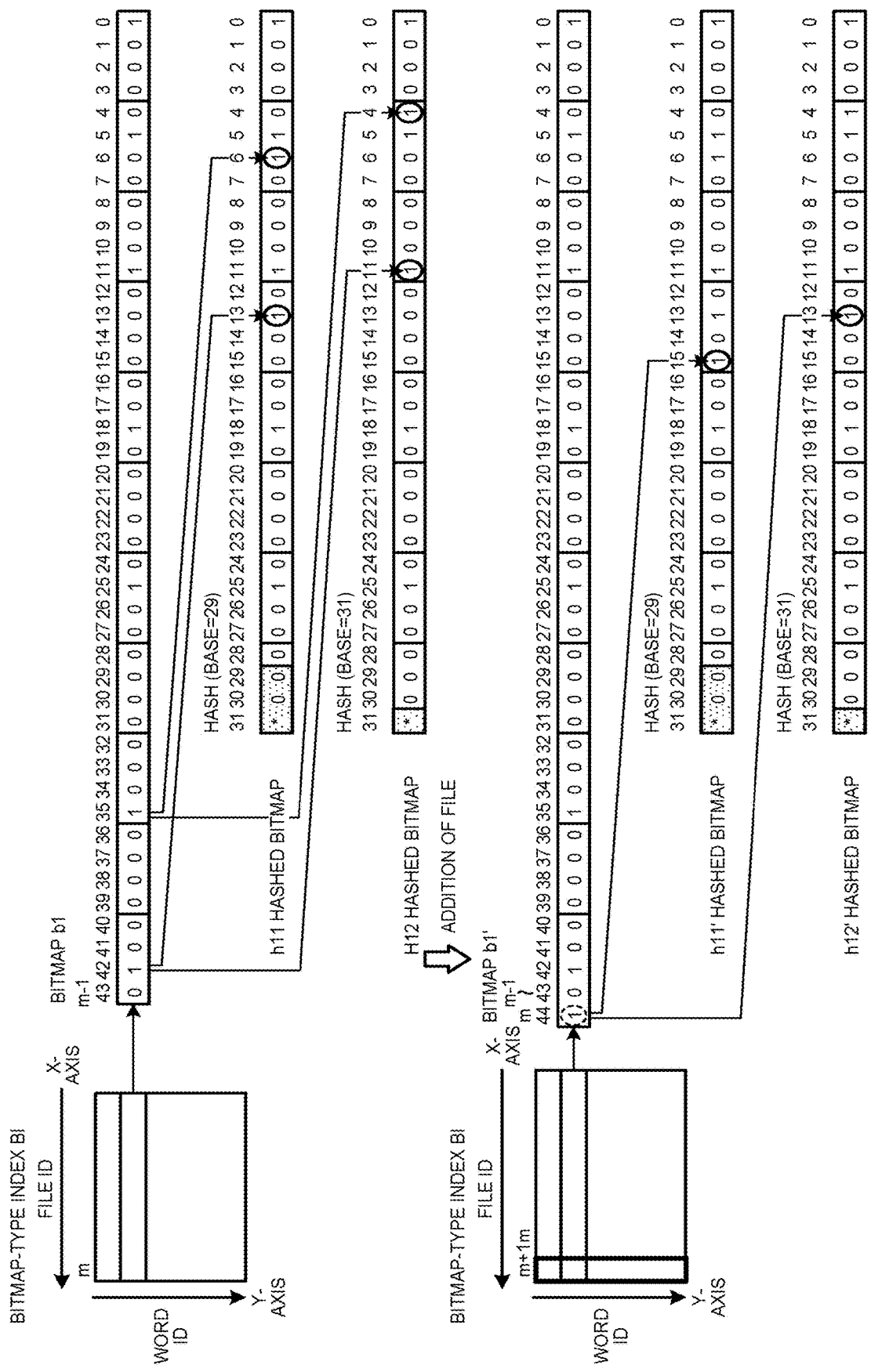
FIG. 2 is a diagram illustrating one example of a bitmap-type index updating process according to a first embodiment.

FIG. 2 is a diagram illustrating one example of a bitmap-type index updating process according to a first embodiment. As illustrated in an upper part of FIG. 2, an index generating process in a bitmap-type index BI generates hashed indexes from the bitmap-type index BI to realize size reduction of the bitmap-type index BI. In other words, the index generating process generates hashed indexes by folding a file axis and a word axis of the bitmap-type index BI utilizing hash values (base numbers), respectively. When a file is updated, the index updating process generates difference information of index information corresponding to a file after update from the index information before the update with respect to the word axis direction or the file axis direction. Herein, "update" mentioned here includes changing a word in a file, adding a file, and deleting a file. The base number to be used in hashing the word axis and the base number to be used in hashing the file axis may be in common or individual.

The bitmap-type index BI mentioned here is an index for full-text retrieval, and includes bit strings that connects pointers specifying words and respective bits indicating the presence information of the words in each target file. Namely, the bitmap-type index BI is a bitmap in which the presence information of words included in a file is indexed for each file. In a retrieval process, this bitmap can be used as an index that indicates whether or not a word to be retrieved is included in accordance with ON•OFF of a bit. For example, a code of a word is employed as a pointer that specifies the word. This code of the word includes a static code and a word code, and means the same as a word ID (IDentification). Moreover, for example, a word itself may be used as a pointer that specifies the word. Namely, the bitmap-type index BI is collected bitmaps of words to be indicated by using respective pointers that specify the words. As illustrated in FIG. 2, the X-axis of the bitmap-type index BI indicates file IDs (IDentifications), and the Y-axis of the bitmap-type index BI indicates the word IDs. In other words, the bitmap-type index BI indicates the presence information of words indicated by respective word IDs for each of the files indicated by the respective plurality of file IDs.

As one example, hashing of a bitmap with respect to an axis (X-axis) direction of a file will be explained. A bitmap b1 corresponding to a certain word ID is indicated. When a word indicated by the word ID exists in the file, binary "1" is set as the presence information of this word in the file, and when this word does not exist in the file, binary "0" is set as the presence information of this word in the file. Detailed explanation of the bitmap-type index BI will be mentioned later.

For example, as illustrated in the upper part of FIG. 2, the index generating process applies a hash function to a bitmap corresponding to each word ID to generate a plurality of hashed bitmaps. Herein, the index generating process is assumed to be performed by using 32-bit registers, and, as one example, hashes each bitmap on the basis of hash values (base numbers) of "29" and "31". Specifically, the index generating process sets a value of each bit in the bitmap corresponding to the word ID at a remainder position in a hashed bitmap using one base number when a position of the corresponding bit in this bitmap is divided by the base number. Positions of the respective bits in the bitmap correspond to the file IDs. As one example, the index generating process sets, at a remainder position in a hashed bitmap h11 using the base number "29" when a position of each bit in the bitmap b1 is divided by the base number "29", a value of the corresponding bit in the bitmap b1. The bit value "1" at the thirty fifth bit position in the bitmap b1 is set at sixth bit in the hashed bitmap h11. The bit value "1" at the forty second bit position in the bitmap b1 is set at the thirteenth bit in the hashed bitmap h11. The index generating process sets, at a remainder position in a hashed bitmap h12 using the base number "31" when a position of each bit in the bitmap b1 is divided by the base number "31", a value of the corresponding bit in the bitmap b1. The bit value "1" at the thirty fifth bit position in the bitmap b1 is set at the fourth bit in the hashed bitmap h12. The bit value "1" at the forty second position in the bitmap b1 is set at the eleventh bit in the hashed bitmap h12. In other words, the index generating process sequentially sets, at from the zero-th to (base number-1)-th bits in the hashed bitmap, the bits from the zero-th bit in the bitmap. The index generating device folds the file axis again so as to set values obtained by respective OR operations with the values having already set in the hashed bitmap from the zero-th bit of the hashed bitmap. As a result, index information of the file IDs "1" to "m" is stored in the bitmap of each of the word IDs indicated by the plurality of words. Herein, the hash values (base numbers) are explained to be "29" and "31".

A lower part of FIG. 2 illustrates a state where a new file "m+1" is added to the state of the upper part of FIG. 2. In the bitmap-type index BI, a bit of the file "m+1" is set for each of word IDs indicated by a plurality of words.

As one example, a bitmap b1' is illustrated, which corresponds to the word ID illustrated in the upper part of FIG. 2. When the word indicated by the word ID exists in the file, binary "1" is set as the presence information of this word in the file, and when this word does not exist in the file, binary "0" is set as the presence information of this word in the file. Herein, "1" is set at the forty fourth bit in the bitmap b1', which indicates that this word exists in the file.

For example, as illustrated in the lower part of FIG. 2, the index updating process applies the hash function to an updated bit of the bitmap corresponding to the word ID so as to update the plurality of hashed bitmaps. Specifically, the index updating process updates a value at a remainder position in a hashed bitmap using one base number when a position of the updated bit in the bitmap corresponding to the word ID is divided by the base number so as to acquire a value obtained by an OR operation between the value of the updated bit and the value having already set in the hashed bitmap. As one example, the index updating process updates a value at a remainder position in a hashed bitmap h11' using the base number "29" when a position of an updated bit in the bitmap b1' is divided by the base number "29" so as to acquire a value "1" obtained by an OR operation between a value "1" of the updated bit and the value "0" having already set. The bit value "1" at the forty fourth bit position in the bitmap b1' is set at the fifteenth bit in the hashed bitmap h11'. The index updating process updates a value at a remainder position in a hashed bitmap h12' using the base number "31" when a position of the updated bit in the bitmap b1' is divided by the base number "31" so as to acquire a value "1" obtained by an OR operation between a value "1" of the updated bit and the value "0" having already set. The bit value "1" at the forty fourth bit position in the bitmap b1' is set at the thirteenth bit in the hashed bitmap h12'. As a result, even when a file is added, the index updating process updates the hashed bitmaps while targeting presence information of a word in the added file, and thus only the difference between the bitmaps can be updated.

One Example of Bitmap-Type Index Updating Process Caused by Deleting File

Figure 3:
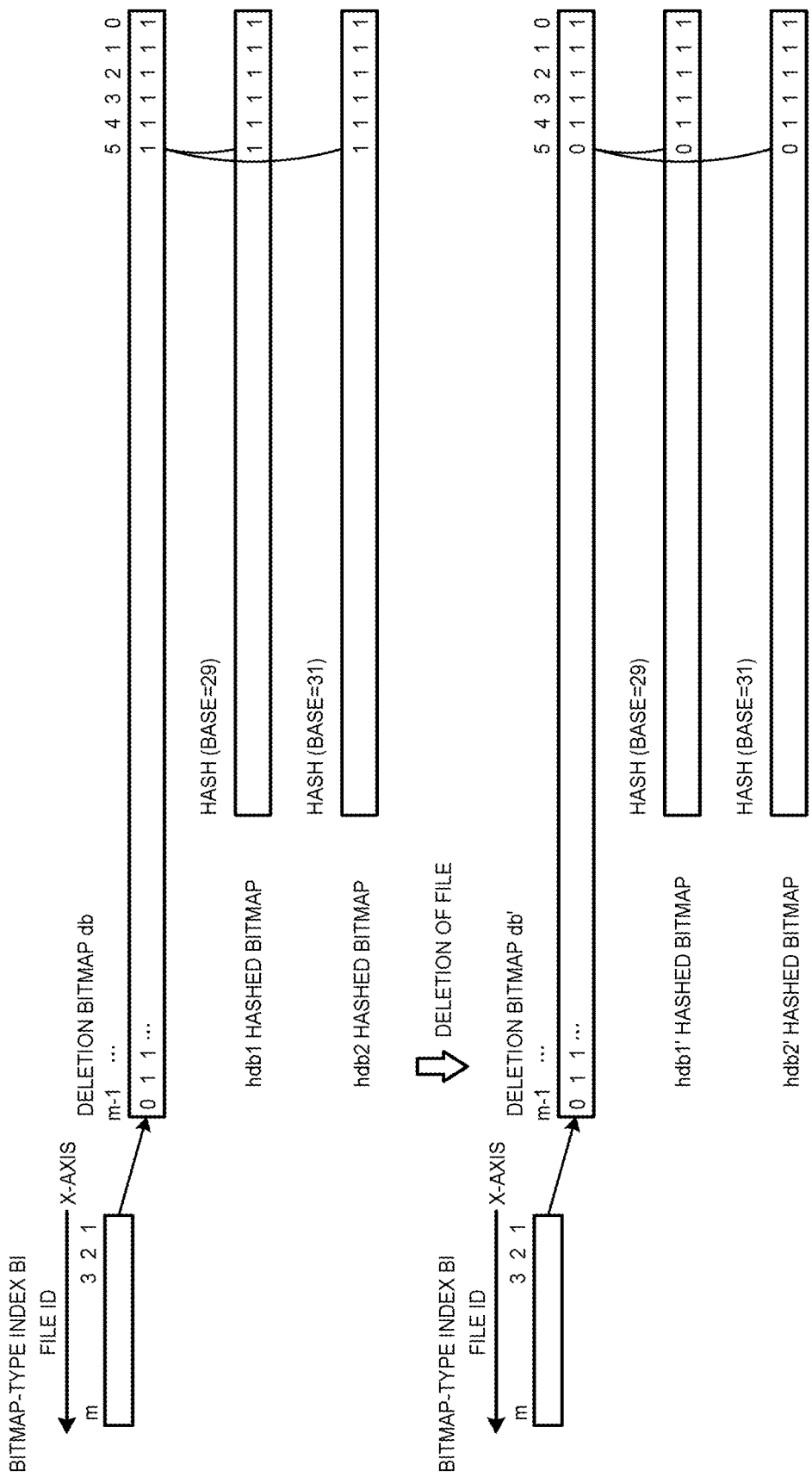
FIG. 3 is a diagram illustrating one example of the bitmap-type index updating process caused by deleting a file.

FIG. 3 is a diagram illustrating one example of the bitmap-type index updating process caused by deleting a file. As illustrated in FIG. 3, the index generating process in the bitmap-type index BI generates a hashed bitmap hdb from a deletion bitmap db so as to realize the size reduction of the bitmap-type index BI.

The deletion bitmap db mentioned here is an index that indicates the present or deleted of a target file by using a bit string. In the deletion bitmap db, a target file of a file ID corresponding to a bit falling into ON (=1) indicates the present. On the other hand, turning to OFF (=0) indicates that this target file is deleted. Thus, when the target file is deleted in a case where retrieval is executed by using the bitmap-type index BI, the target file can be removed from a retrieval target by referring to the deletion bitmap db corresponding to the target file.

The deletion bitmap db is illustrated as one example. When a certain file exists, the binary "1" is set as the presence information of this file, and when not existing, the binary "0" is set as the presence information of this file.

For example, as illustrated in an upper part of FIG. 3, the index generating process applies a hash function to the deletion bitmap db so as to generate a plurality of hashed bitmaps. Specifically, the index generating process sets, in a hashed bitmap using one base number, a value of each bit in this deletion bitmap db at a remainder position when a position of the corresponding bit in the deletion bitmap db is divided by the base number. As one example, the index generating process sets, in a hashed bitmap hdb1 using the base number "29", a value of each bit in the deletion bitmap db at a remainder position when a position of the corresponding bit in the deletion bitmap db is divided by the base number "29". The bit value "1" at the fifth bit position in the deletion bitmap db is set at the fifth bit in the hashed bitmap hdb1. The index generating process sets, in a hashed bitmap hdb2 using the base number "31", a value of each bit in the deletion bitmap db at a remainder position when a position of the corresponding bit in the deletion bitmap db is divided by the base number "31". The bit value "1" at the fifth bit position in the deletion bitmap db is set at the fifth bit in the hashed bitmap hdb2. In other words, the index generating process sequentially sets, at from the zero-th bit to (base number-1)-th bit in the hashed bitmap, the bits from the zero-th bit in the deletion bitmap. The index generating device folds the file axis again so as to set values obtained by respective OR operations with the values having already set in the hashed bitmap from the zero-th bit of the hashed bitmap. As a result, index information of the file IDs "1" to "m" is stored in the deletion bitmap db.

A lower part of FIG. 3 indicates a state where a file 6 is deleted from the state of the upper part of FIG. 3. In the deletion bitmap db', binary "0" is set at a bit of the file 6.

For example, as illustrated in the lower part of FIG. 3, the index updating process applies the hash function to an updated bit in the deletion bitmap db' to update the plurality of hashed bitmaps. Specifically, the index updating process updates a value at a remainder position in a hashed bitmap using one base number when a position of the updated bit in the deletion bitmap db' is divided by the base number so as to acquire a value obtained by an AND operation between a value "0" of the updated bit and the value having already set in a hashed bitmap hdb1'. As one example, the index updating process updates a value at a remainder position in the hashed bitmap hdb1' using the base number "29" when a position of an updated bit in the deletion bitmap db' is divided by the base number "29" so as to acquire a value "0" obtained by an AND operation between a value "0" of the updated bit and the value "1" having already set. The bit value "0" at the fifth bit position in the deletion bitmap db' is set at the fifth bit in the hashed bitmap hdb1'. Similarly, the index updating process updates a value at a remainder position in a hashed bitmap hdb2' using the base number "31" when a position of the updated bit in the deletion bitmap db' is divided by the base number "31" so as to acquire a value "0" obtained by an AND operation between a value "0" of the updated bit and the value "1" having already set. The bit value "0" at the fifth bit position in the deletion bitmap db' is set at the fifth bit in the hashed bitmap hdb2'.

One Example of Bitmap-Type Index

Figure 4:
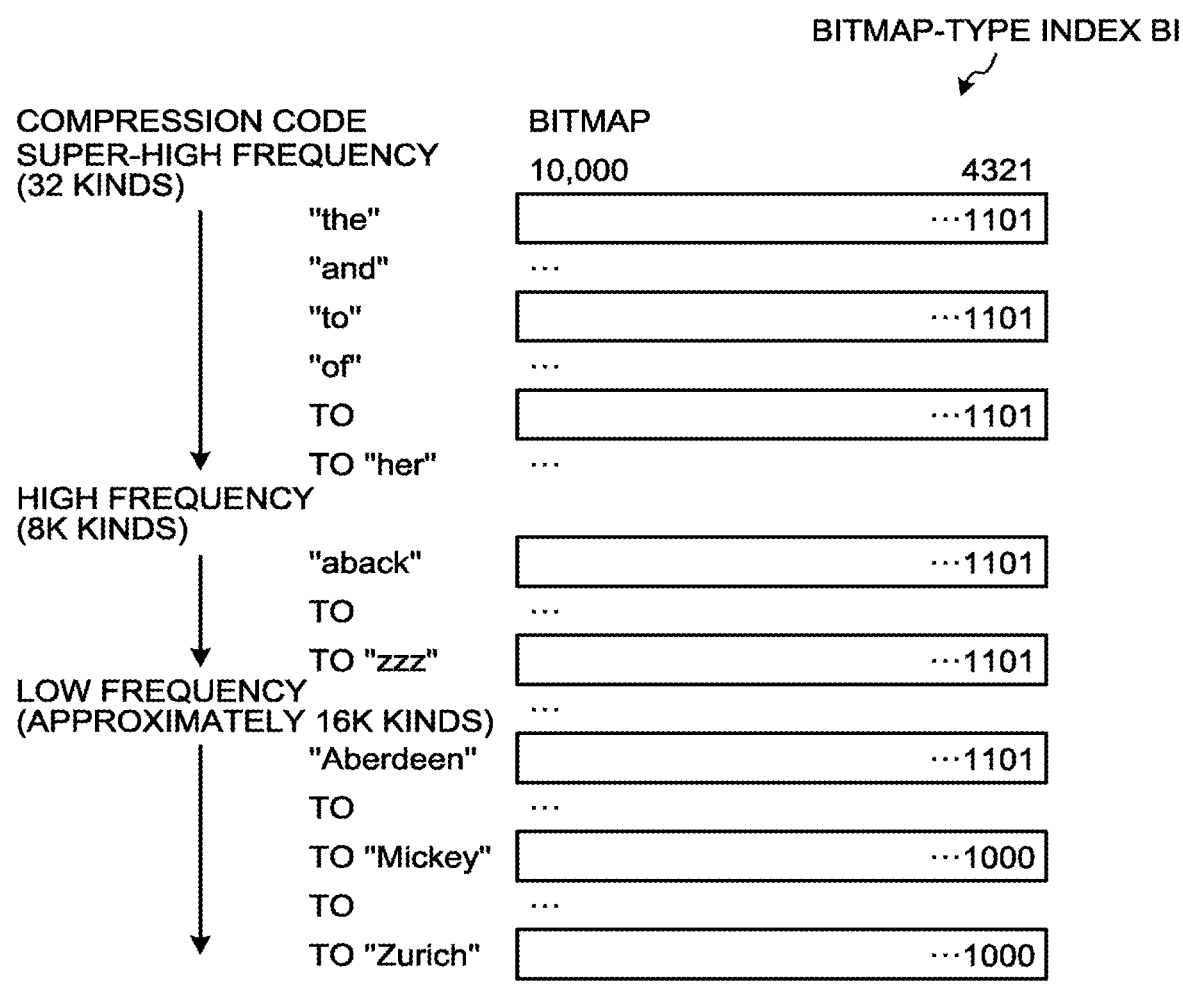
FIG. 4 is a diagram illustrating a configuration example of a bitmap-type index according to the first embodiment.

Next, one example of the bitmap-type index BI according to the first embodiment will be explained with reference to FIG. 4. FIG. 4 is a diagram illustrating a configuration example of the bitmap-type index according to the first embodiment. As illustrated in FIG. 4, the bitmap-type index BI associates compression codes (corresponding to word IDs) according to super-high frequency words, high frequency words, and low frequency words with respective bitmaps. The bitmaps are code-bit strings indicating that each of the super-high frequency words, the high frequency words, and the low frequency words is included in any of the compressed files. The bit of the bitmaps indicates whether or not each of the super-high frequency words, the high frequency words, and the low frequency words is included in each of the compressed files.

The bitmap-type index BI associates bitmaps by, for example, 32 kinds of super-high frequency words, 8K (8000) kinds of high frequency a words, and 16 K (16000) kinds of low frequency words. The super-high frequency word indicates a word whose appearance frequency is high when the appearance frequencies of respective words are tallied in a group of files for tallying the appearance frequencies. For example, the super-high frequency word is a word whose rank of appearance frequency in the files for tallying the appearance frequencies is within top 32 places. The high frequency word is a word whose rank of appearance frequency in the files for tallying the appearance frequencies is within top 8000 places. The low frequency word is a word whose rank of appearance frequency in the files for tallying the appearance frequencies is within top less than 24000 places, and a character string of numerical value or a word extracted form a target file. As one example of the word, a specialized word, a new word, and an unknown word are given. The specialized word mentioned here is a word that is available in a specific area of learning, a specific business field, etc., and has a feature of repeatedly appearing in a target file. The new word is a newly made word such as a vogue word, and has a feature of repeatedly appearing in a target file. An unknown word is a word that is neither the specialized word nor the new word, and has a feature of repeatedly appearing in a file.

For example, in the first effective row of the bitmap-type index BI, a bitmap of a word "the" indicated by a compressed code is " . . . 1101". The bitmap of the first effective row in the bitmap-type index BI indicates files that include the compressed code of "the". The bitmap " . . . 1101" indicates that a file 1 includes "the" because "1" is stored in the first bit, a file 2 does not include "the" because "0" is stored in the second bit, and a file 3 includes "the" because "1" is stored in the third bit. The bitmap " . . . 1101" indicates that a file 4 includes "the" because "1" is stored in the fourth bit. Moreover, the bitmap " . . . 1101" also indicates whether or not each of the other files after a file 5 includes "the".

Generating Process of Bitmap-Type Index

Figure 5:
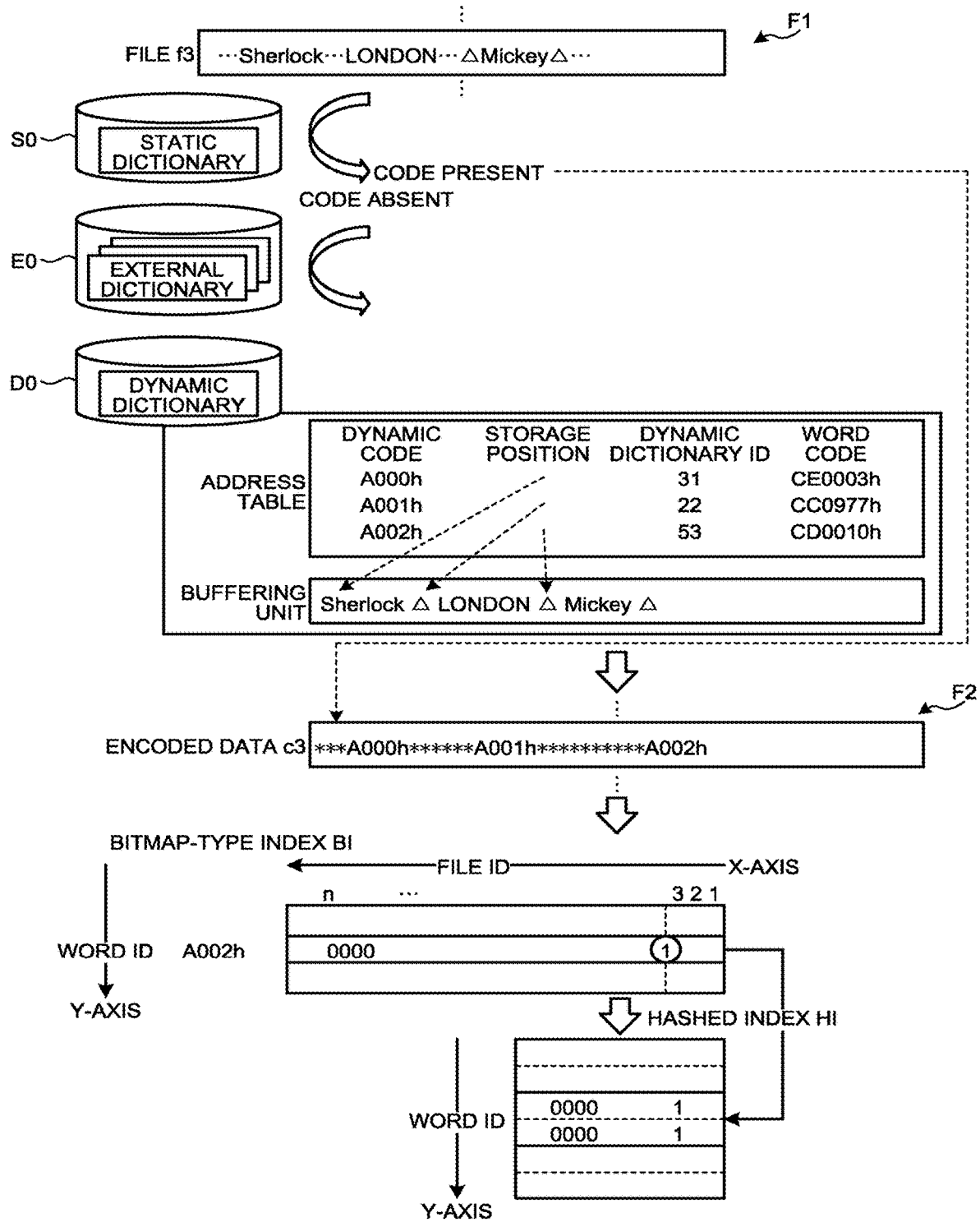
FIG. 5 is a diagram illustrating one example of a bitmap-type index generating process according to the first embodiment.

Herein, a generating process of the bitmap-type index BI according to the first embodiment will be explained with reference to FIG. 5. FIG. 5 is a diagram illustrating one example of the bitmap-type index generating process according to the first embodiment. As illustrated in FIG. 5, when encoding words included in a specific file by using a static dictionary S0 and a dynamic dictionary D0, the encoding process extracts a word included in an external dictionary E0 among words not registered in the static dictionary S0. The encoding process registers, in the dynamic dictionary D0, a code of the extracted word in the external dictionary E0 and a dynamic code to be assigned dynamically in association with each other.

The static dictionary S0 mentioned here is a dictionary in which the appearance frequency of a word appearing in a document is specified on the basis of general English-language dictionaries, general Japanese-language dictionaries, general textbooks, etc., and a shorter code is assigned to a word whose appearance frequency is higher. In the static dictionary S0, static codes are preliminary registered, which are codes corresponding to respective words.

The dynamic dictionary D0 mentioned here associates a word not registered in the static dictionary S0 but registered in the external dictionary E0, a code in the external dictionary E0, and a dynamic code assigned dynamically with one another. Words not registered in the static dictionary S0 include, as an example, a word (low frequency word) whose appearance frequency is low. This word (low frequency word) may be a specialized word, a new word, an unknown word, etc. In a buffering unit of the dynamic dictionary D0, in accordance with the appearance order of words not registered in the static dictionary S0, the words associated with respective dynamic codes are registered. Detailed explanation of the dynamic dictionary D0 will be mentioned later.

The external dictionary E0 mentioned here is a dictionary that associates words not registered in the static dictionary S0 and respective word codes with each other for each specialty. The external dictionary E0 includes, as an example, specialized dictionaries, new-word dictionaries, unknown-word dictionaries, etc. The specialized dictionary memorizes specialized words. The new-word dictionary memorizes new words. The unknown-word dictionary memorizes unknown words. The dynamic code to be assigned to a low frequency word differs for each target file even in a case of the same word. A word code in the external dictionary E0 is, in a case of the same word, shared between target files.

Hereinafter, one example of an encoding process of the encoding device will be explained. For example, the encoding process loads a target file f3 in a file F1 on a memory region. Herein, "3" of the file f3 indicates that a file ID is "3".

The encoding process reads out the target file f3 from the memory region, and executes lexical analysis on the read out file f3. The lexical analysis mentioned here is dividing a file in a state not encoded into words.

The encoding process compares the static dictionary S0 with a character string of the word so as to determine whether or not there exists a code corresponding to the character string of the word in the static dictionary S0. This determination process may compare the character string of the word with a bit filter that specifies a character string of a word that can be encoded by using the static dictionary S0 so as to determine whether or not the character string of the word is hit in the bit filter. The bit filter mentioned here is a filter that specifies a character string of a word that can be encoded by using the static dictionary S0. When there exists a code corresponding to a character string of a word in the static dictionary S0, the encoding process encodes the character string of the word into a code (static code) corresponding to the character string of this word on the basis of the static dictionary S0 to output the static code.

When there exists no code corresponding to the character string of the word in the static dictionary S0, the encoding process acquires, from the external dictionary E0, a code (word code) corresponding to the character string of the word and an ID of the external dictionary E0 in which this word is registered. The encoding process may assign a code in the external dictionary E0 by using the own device, or may inquire a master device that assigns word codes. In the embodiment, the case in which the encoding process assigns a code in the external dictionary E0 to the own device is exemplified.

The encoding process registers, in the dynamic dictionary D0, a character string of a word, a code (word code) in the external dictionary E0, and a dynamic code assigned dynamically. The encoding process encodes, on the basis of the dynamic dictionary D0, the registered character string of the word into a word code corresponding to this registered character string of the word to output this word code. When the character string of the word is registered in the dynamic dictionary D0, the encoding process may encode the character string of this word into a word code corresponding to the character string of this word on the basis of the dynamic dictionary D0, and may output this word code.

The encoding process outputs the word codes based on the static codes and the dynamic dictionary D0 to an area of encoded data c3 in the appearance order of the words. The area of encoded data c3 is an area of encoded data in the encoded file F2, which corresponds to the file f3.

When encoding process of the target file f3 is completed, the index generating process sets, for the bitmap-type index BI, presence information of each of the plurality of word codes in the file f3.

As one example, a bitmap corresponding to a word ID "A002h" of "Mickey" is illustrated. When a word "Mickey" indicated by the word ID "A002h" exists in a file, "ON", namely "1" in binary is set as presence information of the file including this word, and when this word does not exist in the file, "OFF", namely "0" in binary is set as presence information of the file including this word. Herein, because the Word "Mickey" exists in the file f3, "1" is set at a bit corresponding to a file ID "3" in a bitmap corresponding to the word ID "A002h" of "Mickey".

The index generating process generates a hashed index HI from the bitmap-type index BI. In other words, the index generating process generates, on the basis of a plurality of adjacent hash values (base numbers), a hashed index obtained by application of hashing with respect to, for example, an axis (X-axis) of the file. A method for generating the hashed index is similar to that having explained in the upper part of FIG. 2, and thus the explanation thereof is omitted.

One Example of Dynamic Dictionary

Figure 6:
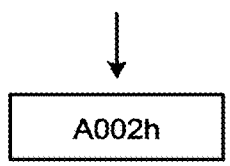
FIG. 6 is a diagram illustrating one example of a dynamic dictionary according to the first embodiment.

FIG. 6 is a diagram illustrating one example of the dynamic dictionary according to the first embodiment. The dynamic dictionary D0 illustrated in FIG. 6 includes a buffering unit D1 and an address table D2. The buffering unit D1 memorizes character strings. The address table D2 retains dynamic codes, storage positions, data lengths, external dictionary IDs, and word codes in association with one another. The dynamic codes are preliminary-fixed length codes to which the respective character strings are assigned in accordance with the registration order thereof. Herein, the dynamic code is a fixed-length code of three bytes, which starts from hexadecimal "F". The storage position indicates a stored position of a character string in the buffering unit D1. The data length indicates the length (byte length) of a character string stored in the buffering unit D1. The external dictionary ID indicates an ID of the external dictionary E0 in which the word is registered. The word code is a code assigned to a word, and is, for example, a compression code. Even when the word is registered in the dynamic dictionary D0, this word code is used in a plurality of files in common as long as the word code corresponds to the same word.

For example, the case in which a dynamic code is assigned to a character string of the word "Mickey" will be explained. The encoding process stores a character string of the word "Mickey" in the buffering unit D1. The encoding process registers, in the address table D2, a storage position where the character string of the word is stored and the stored data length. Moreover, the encoding process registers, in the address table D2, the word code and the external dictionary ID, which are assigned to the character string of the word "Mickey". Herein, the encoding process registers, in the address table D2, "16" as the storage position, "6" as the data length, "53" as the external dictionary ID, and "CD0010h" as the word code.

The encoding process encodes a character string of a word into a word code in the address table D2, which is associated with the character string of this word. Herein, the encoding process encodes the character string of the word "Mickey" into a dynamic code "A002h" associated with the character string of this word.

One Example of Hashing of Y-Axis

Figure 7:
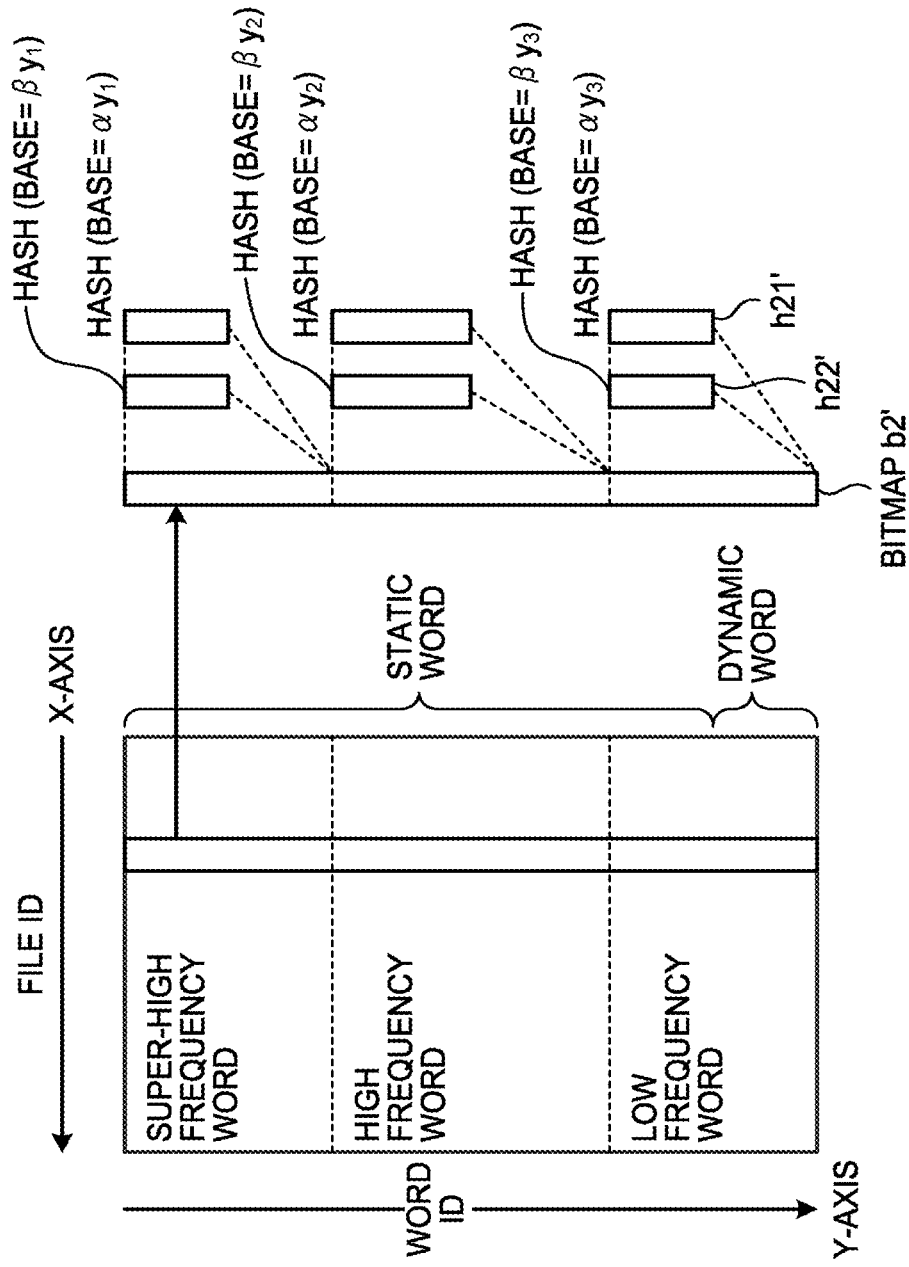
FIG. 7 is a diagram illustrating one example of Y-axis-direction hashing of the bitmap-type index according to the first embodiment.

Herein, hashing of bitmaps in an axis (Y-axis) direction of word IDs in the bitmap-type index BI will be explained with reference to FIG. 7. FIG. 7 is a diagram illustrating one example of the Y-axis-direction hashing of the bitmap-type index according to the first embodiment. As illustrated in FIG. 7, the index generating process applies a hash function to bitmaps corresponding to the file IDs to generate a plurality of hashed bitmaps. Herein, the index generating process divides the Y-axis into three parts in accordance with the appearance frequencies, and hashes, by using a combination of different base numbers, each of the bitmaps obtained by the dividing into the three parts. As one example, with regard to the super-high frequency words, the index generating process hashes the bitmaps corresponding to the super-high frequency words in the Y-axis direction on the basis of hash values (base numbers) of $\alpha_{y1}$ and $\beta_{y1}$. With regard to the high frequency words, the index generating process hashes the bitmaps corresponding to the high frequency words in the Y-axis direction on the basis of hash values (base numbers) of $\alpha_{y2}$ and $\beta_{y2}$. With regard to the low frequency words, the index generating process hashes the bitmaps corresponding to the low frequency words in the Y-axis direction on the basis of hash values (base numbers) of $\alpha_{y3}$ and $\beta_{y3}$.

The index updating process applies a hash function to an updated bit of a bitmap corresponding to a file ID to update a plurality of hashed bitmaps. For example, when a low frequency word is added to the file, the index updating process updates the hashed bitmaps using the base numbers $\alpha_{y3}$ and $\beta_{y3}$ by using a value of the updated bit in a bitmap of the low frequency words within the bitmaps corresponding to the file ID. In other words, the index updating process changes, into a value "1" obtained by an OR operation between a value "1" of the updated bit and the already set value "0", a value of a remainder position in a hashed bitmap h21' when a position of a updated bit in a bitmap corresponding to the low frequency words in a bitmap b2' is divided by the base number $\alpha_{y3}$. The index updating process changes, into a value "1" obtained by an OR operation between a value "1" of the updated bit and the already set value "0", a value of a remainder position in a hashed bitmap h22' using the base number $\beta_{y3}$ when a position of a updated bit in a bitmap corresponding to the low frequency words in a bitmap b2' is divided by the base number $\beta_{y3}$. As a result, even when an unknown word is added to the file, the index updating process updates the hashed bitmap while targeting presence information of the added unknown word, and thus only the difference between the bitmaps can be updated.

One Example of Retrieval Process

Figure 8:
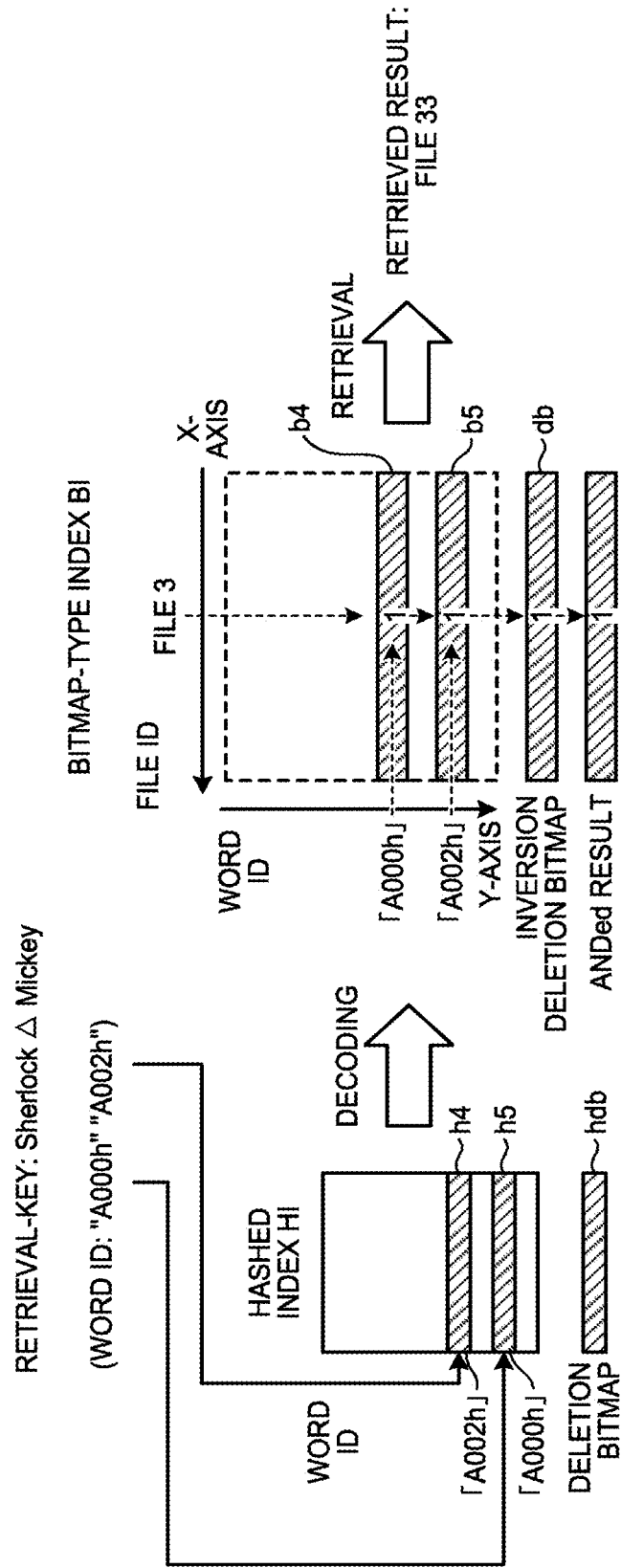
FIG. 8 is a diagram illustrating one example of a retrieval process according to the first embodiment.

FIG. 8 is a diagram illustrating one example of a retrieval process according to the first embodiment. As illustrated in FIG. 8, when accepting an input of a retrieval word, the retrieval process extracts, from the hashed index HI, a plurality of hashed bitmaps corresponding to a word ID indicated by the accepted retrieval word. Herein, "Sherlock" and "Mickey" are assumed to be input as retrieval words. The retrieval process extracts, from the hashed index HI, a plurality of hashed bitmaps h5 corresponding to a word ID "A000h" indicated by "Sherlock" that is accepted as the retrieval word. The plurality of hashed bitmaps h5 includes a hashed bitmap h51 using the base number "29" and a hashed bitmap h52 using the base number "31". The retrieval process extracts, from the hashed index HI, a plurality of hashed bitmaps h4 corresponding to a word ID "A002h" indicated by "Mickey" that is accepted as the retrieval word. The plurality of hashed bitmaps h4 includes a hashed bitmap h41 using the base number "29" and a hashed bitmap h42 using the base number "31".

The retrieval process decodes the plurality of hashed bitmaps corresponding to the extracted word ID and hashed deletion bitmaps. The decoding process of the plurality of hashed bitmaps will be mentioned later. The decoded result is indicated by using a bitmap corresponding to the word ID. Herein, the retrieval process decodes the plurality of hashed bitmaps h4 corresponding to the word ID "A002h" so as to output a bitmap b4 as a decoded result. The retrieval process decodes the plurality of hashed bitmaps h5 corresponding to a word ID "A000h" so as to output a bitmap b5 as a decoded result. The retrieval process decodes the hashed deletion bitmaps hdb, and outputs the deletion bitmap db as a decoded result.

The retrieval process executes an AND operation between the bitmap b4 of the word ID "A002h", the bitmap b5 of the word ID "A000h", and the inverted deletion bitmap db. The retrieval process outputs file IDs whose bits of the ANDed results are ON ("1") as a retrieved result. Herein, the file 3 whose file ID is "3" is output as a retrieved result. Thus, the retrieval process decodes hashed bitmaps of the retrieval target and uses only the decoded bitmap, so that it is possible to rapidly narrow a file in which the word indicated by the retrieval key exists.

One Example of Hashed-Bitmap Decompressing Unit

Figure 9:
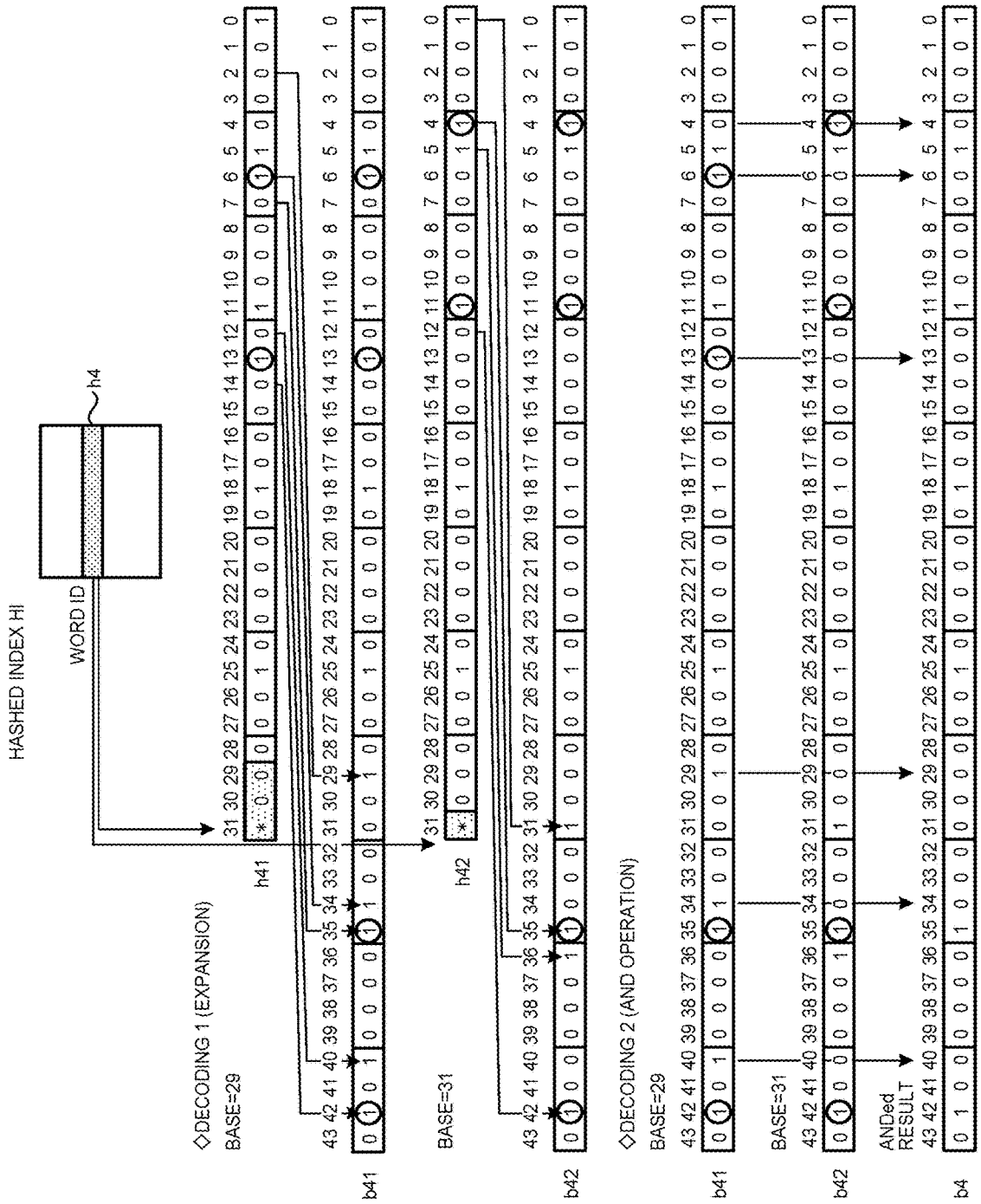
FIG. 9 is a diagram illustrating one example of a hashed-bitmap decoding process according to the first embodiment.

FIG. 9 is a diagram illustrating one example of a hashed-bitmap decoding process according to the first embodiment. As illustrated in FIG. 9, the hashed-bitmap decoding process decodes hashed bitmaps corresponding to a word ID into bitmaps whose hashes are expanded. The hashed-bitmap decoding process is executed when retrieving a file in which words constituting a retrieval word exist.

The retrieval process expands a plurality of hashed bitmaps h41 and h42 of the hashed bitmap h4 (see FIG. 8) into bitmaps, respectively (first decoding process). Herein, in a bitmap that is a decoding destination of a hashed bitmap using one base number, the retrieval process sets a value of each bit in the hashed bitmap at a position where a position of the corresponding bit in the hashed bitmap is added to a value obtained by multiplying the base number by an integral number (from "0"). As one example, in a bitmap b41 that is a decoding destination of the hashed bitmap h41 using the base number "29", the retrieval process sets a value of each bit in the hashed bitmap h41 at a position where a position of the corresponding bit in the hashed bitmap h41 is added to a value obtained by multiplying the base number "29" by "0". In the bitmap b41 that is the decoding destination of the hashed bitmap h41 using the base number "29", the retrieval process sets a value of each bit in the hashed bitmap h41 at a position where a position of the corresponding bit in the hashed bitmap h41 is added to a value obtained by multiplying the base number "29" by "1". The retrieval process is repeated until a bit value at the largest-bit position in the bitmap b41 corresponding to the base number "29" that is the decoding destination is set. Similarly, in a bitmap b42 that is a decoding destination of the hashed bitmap h42 using the base number "31", the retrieval process sets a value of each bit in the hashed bitmap h42 at a position where a position of the corresponding bit in the hashed bitmap h42 is added to a value obtained by multiplying the base number "31" by "0". In the bitmap b42 that is the decoding destination of the hashed bitmap h42 using the base number "31", the retrieval process sets a value of each bit in the hashed bitmap h42 at a position where a position of the corresponding bit in the hashed bitmap h42 is added to a value obtained by multiplying the base number "31" by "1". The retrieval process repeats until a bit value at the largest-bit position in the bitmap b42 that is the decoding destination is set.

The retrieval process executes an AND operation (second decoding process) between bits at the corresponding positions in the respective bitmaps decoded in the first decoding process. Herein, the retrieval process executes an AND operation between the bitmap b41 decoded form the hashed bitmap h41 using the base number "29" and the bitmap b42 decoded form the hashed bitmap h42 using the base number "31". The retrieval process outputs, as a decoded result, the bitmap b4 that is an ANDed result.

Configuration of Encoding Device

Figure 10:
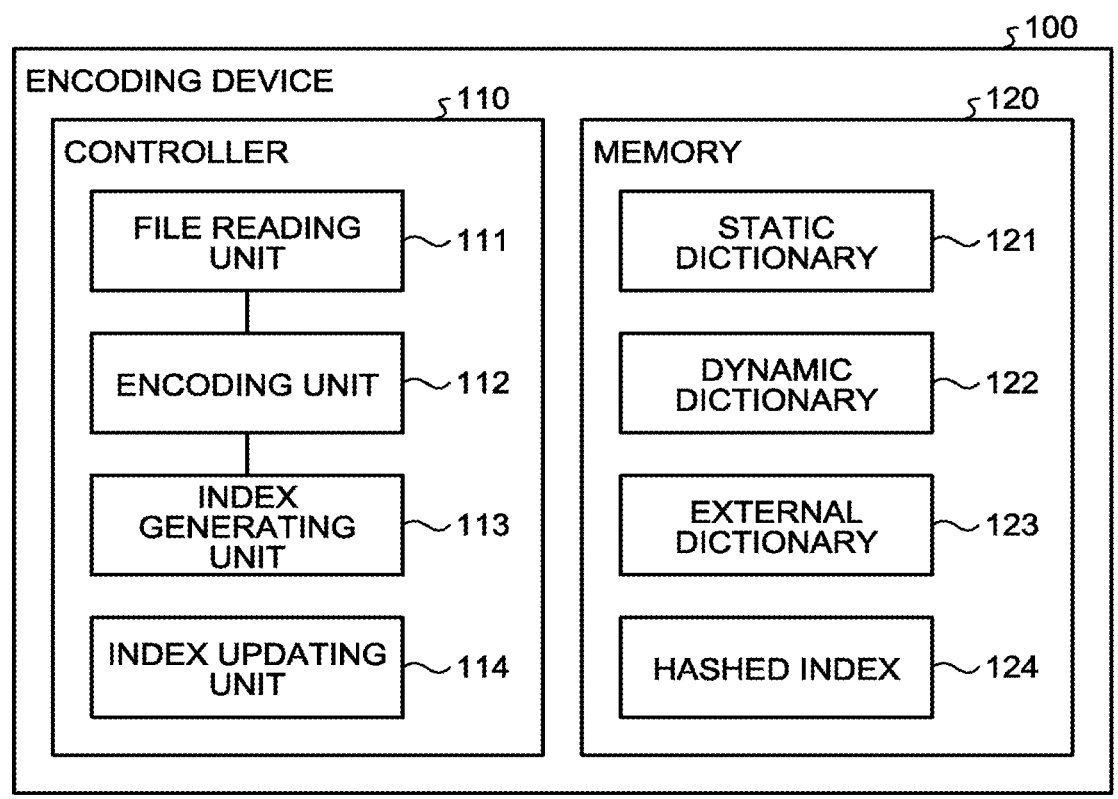
FIG. 10 is a functional block diagram illustrating a configuration of an encoding device according to the first embodiment.

Next, a configuration of an encoding device 100 according to the first embodiment will be explained with reference to FIG. 10. FIG. 10 is a functional block diagram illustrating a configuration of the encoding device according to the first embodiment. As illustrated in FIG. 10, the encoding device 100 includes a controller 110 and a memory 120.

The controller 110 is a process unit that executes the index generating process, the encoding process, and the index updating process, which are illustrated in FIGS. 2, 3, and 5. The controller 110 includes an internal memory that stores control data and programs defining various processing procedures so as to execute various processes by using them. The controller 110 corresponds to an electronic circuit of an integrated circuit such as an Application Specific Integrated Circuit (ASIC) and a Field Programmable Gate Array (FPGA). Or, the controller 110 corresponds to an electronic circuit such as a Central Processing Unit (CPU) and a Micro Processing Unit (MPU). The controller 110 includes a file reading unit 111, an encoding unit 112, an index generating unit 113, and an index updating unit 114.

The memory 120 corresponds to a memory device that is, for example, a non-volatile semiconductor memory element such as a Flash Memory and a Ferroelectric Random Access Memory (FRAM: Registered Trademark); and the like. The memory 120 includes a static dictionary 121, a dynamic dictionary 122, an external dictionary 123, and a hashed index 124. A configuration of the hashed index 124 is similar to the configuration (see FIG. 5) of the collected hashed bitmaps corresponding to the word IDs, and thus the explanation thereof is omitted.

The static dictionary 121 is a dictionary that specifies the appearance frequencies of words appearing in documents on the basis of general English-language dictionaries, general Japanese-language dictionaries, general textbooks, etc., and assigns shorter codes to words whose appearance frequencies are higher. The static dictionary 121 corresponds to the static dictionary S0 illustrated in FIG. 5.

The dynamic dictionary 122 is a dictionary that associates words not registered in the static dictionary 121, respective dynamic codes assigned dynamically, and the word codes with one another. The dynamic dictionary 122 corresponds to the dynamic dictionary D0 illustrated in FIGS. 5 and 6. The explanation of the dynamic dictionary 122 is similar to that of FIG. 6, and thus the explanation thereof is omitted.

The external dictionary 123 is a dictionary that associates words not registered in the static dictionary 121 and word codes with each other for each specialty. The external dictionary 123 includes, for example, specialized dictionaries, new-word dictionaries, and unknown-word dictionaries. As one example, the external dictionary 123 associates character strings of words and respective word codes with each other for each of the dictionaries. The external dictionary 123 corresponds to the external dictionary E0 illustrated in FIG. 5.

The file reading unit 111 reads out, in a memory region, the target file F1. The file reading unit 111 reads out the file F1 from the memory region, and executes lexical analysis on the read out file F1. The file reading unit 111 sequentially outputs the words of the lexically analyzed results to the encoding unit 112.

The encoding unit 112 encodes the words having output from the file reading unit 111.

For example, the encoding unit 112 determines whether or not a character string of the target word having output from the file reading unit 111 is registered in the static dictionary 121. As one example, the encoding unit 112 determines whether or not the character string of the target word is hit in the bit filter of the static dictionary 121. When the character string of the target word is registered in the static dictionary 121, the encoding unit 112 encodes the character string of this word on the basis of the static dictionary 121. As one example, the encoding unit 112 encodes the character string of the word into a static code (word code) corresponding to the character string of this word on the basis of the static dictionary 121. The encoding unit 112 outputs the encoded word code to the index generating unit 113.

When the character string of the target word is not registered in the static dictionary 121, the encoding unit 112 encodes the character string of this word on the basis of the dynamic dictionary 122. As one example, the encoding unit 112 determines whether or not the character string of the word is already stored in the buffering unit D1 of the dynamic dictionary 122. When the character string of the word is not already stored in the buffering unit D1 of the dynamic dictionary 122, the encoding unit 112 acquires, from the external dictionary 123, a word code corresponding to the character string of this word and an ID of a dictionary in which this word is registered. The encoding unit 112 stores, in a record corresponding to a new dynamic code in the address table D2, the word code and the ID of the dictionary in which the word is registered. In addition, the encoding unit 112 stores the character string of the word in the buffering unit D1, and further stores a storage position where the character string of this word is stored and the length of the stored data in the record corresponding to the new dynamic code of the address table D2. The encoding unit 112 encodes the character string of the word into a word code of the address table D2 which is associated with the character string of this word. The encoding unit 112 outputs the encoded word code to the index generating unit 113.

The index generating unit 113 generates bitmaps on the basis of the encoded word code group. For example, the index generating unit 113 hashes bits, which corresponds to the file F1, in the bitmap corresponding to the word code having output from the encoding unit 112 so as to set "1". When there exists a word not processed in the file F1, the index generating unit 113 causes the encoding unit 112 to execute the encoding process on the next word. In a case where there exists no word not processed in the file F1, when there exists another target file, the index generating unit 113 causes the encoding unit 112 to execute the encoding process on the another target file.

The index generating unit 113 generates the hashed index 124 on the basis of a plurality of hash values (base numbers). For example, the index generating unit 113 generates a plurality of hashed bitmaps corresponding to each of the bitmaps that corresponds to the respective plurality of word IDs (word codes). As one example, the index generating unit 113 generates hashed bitmaps based on two hash values (base numbers), which correspond to each of the bitmaps corresponding to the respective plurality of word IDs. In other words, the index generating unit 113 sequentially sets the bits from the zero-th bit in the bitmap for the zero-th to (base number-1)-th bits in the hashed bitmap. The index generating unit 113 folds the file axis again so as to set, from the zero-th bit in the hashed bitmap, values on which OR operations are sequentially executed with the respective values having already set in the hashed bitmap. When the hashed bitmaps are generated for each of the bitmaps corresponding to all of the respective word IDs, the index generating unit 113 stores, in the memory 120, the hashed index 124 in which the generated hashed bitmaps are collected.

In a case where a file is added, the index updating unit 114 updates bits in hashed bitmaps which corresponds to the added bit in the bitmap corresponding to the file ID of the added file.

For example, the index updating unit 114 sets, in the hashed index 124, a bit associated with the file ID of the added file. As one example, in the deletion bitmap, the index updating unit 114 sets a bit of "0" (OFF) for a file ID of an added file, and further sets a bit of "1" (ON) for a deleted file ID of a deleted file. The index updating unit 114 changes, in a bitmap corresponding to a word code (word ID) of a word included in an added file, a bit corresponding a file ID of this added file into "1". The index updating unit 114 updates hashed bitmaps based on two hash values (base numbers), which correspond to the updated bit in the bitmap corresponding to the word ID. As one example, the base numbers are assumed to be "α" and "β". The index updating unit 114 changes, into a value "1" obtained by an OR operation between the value "1" of the updated bit and the value "0" having already set, a value at a remainder position in a hashed bitmap using the base number "α" when a position of the updated bit is divided by "α". The index updating unit 114 changes, into a value "1" obtained by an OR operation between the value "1" of the updated bit and the value "0" having already set, a value at a remainder position in a hashed bitmap using the base number "β" when a position of the updated bit is divided by "β". Similarly, the index updating unit 114 updates hashed bitmaps based on the two hash values (base numbers), which correspond to an updated bit of the deletion bitmap. Thus, the index updating unit 114 can update, in accordance with addition of a file, only the difference part in the hashed index 124 indicating that a predetermined word is included in any of the plurality of files.

When a file is deleted, the index updating unit 114 updates a hashed bitmap corresponding to a file ID of the deleted file. For example, the index updating unit 114 changes, in a deletion bitmap, a bit at a file ID of the deleted file into "1". The index updating unit 114 updates hashed bitmaps based on the two hash values (base numbers), which correspond to the updated bit in the deletion bitmap. Thus, the index updating unit 114 can update, in accordance with deletion of a file, only the difference parts in the deletion hashed bitmaps indicating that any of the plurality of files is deleted.

Processing Procedure of Index Generating Process

Figure 11:
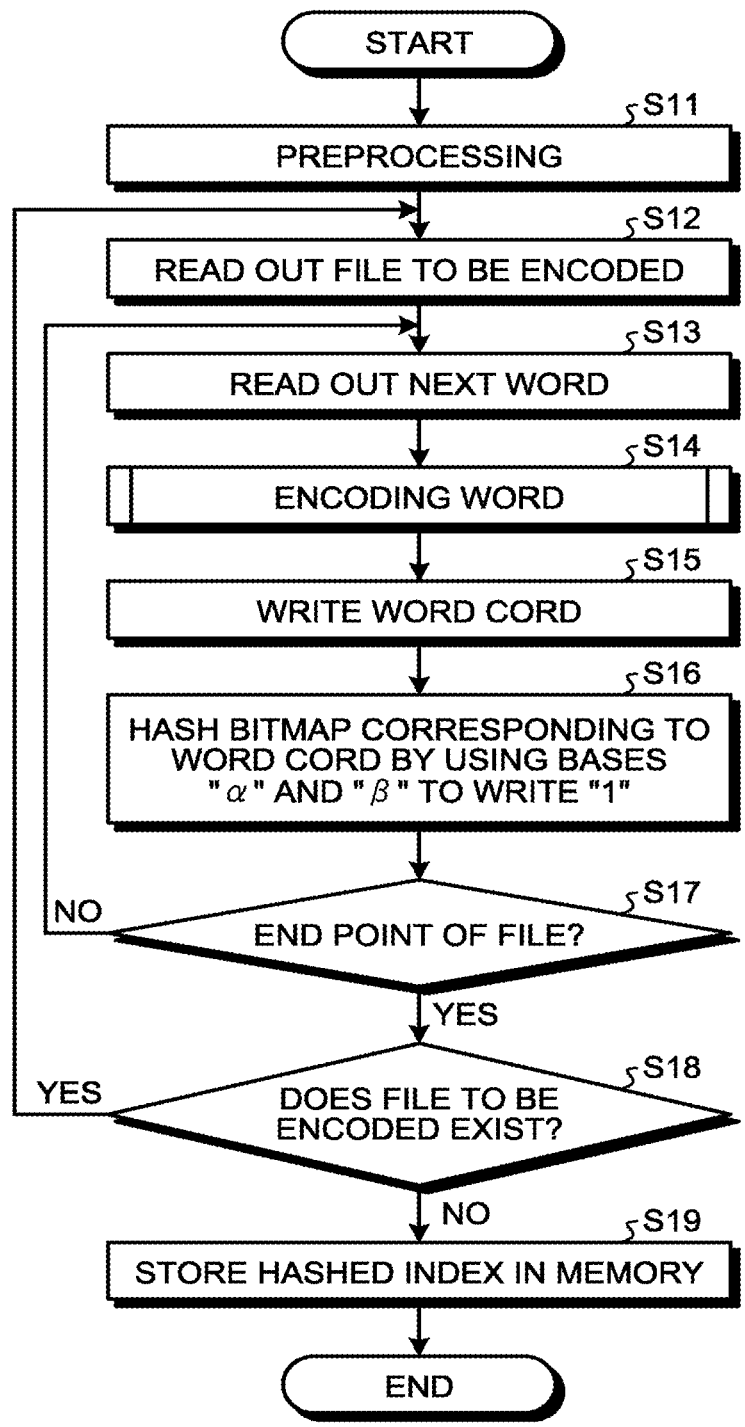
FIG. 11 is a flowchart illustrating one example of an index generating process according to the first embodiment.

Next, a processing procedure of the index generating process according to the first embodiment will be explained with reference to FIG. 11. FIG. 11 is a flowchart illustrating one example of the index generating process according to the first embodiment.

As illustrated in FIG. 11, the encoding unit 112 executes preprocessing (Step S11). For example, the encoding unit 112 ensures various memory regions in the memory 120. The encoding unit 112 reads out a character string of one target file within a plurality of target files for encoding, and stores the file in a memory region for being read out (Step S12).

The encoding unit 112 reads out a character string of words of one target file from the memory region for being read out (Step S13). For example, the encoding unit 112 executes lexical analysis on one target file, and reads out a character string of the words of the lexically analyzed result from the head thereof.

The encoding unit 112 encodes the read out words (Step S14). Explanation of an encoding process of the words will be mentioned later. The encoding unit 112 writes word codes output from the encoding process of the words into a memory region for the encoded data, which corresponds to the target file (Step S15).

Next, the index generating unit 113 hashes a bitmap corresponding to the word code so as to write "1" (Step S16). For example, the index generating unit 113 sets, for a hashed bitmap using the base number "α", a value of each bit at a remainder position when a position of the corresponding bit in the bitmap is divided by the base number "α". The index generating unit 113 sets, for a hashed bitmap using the base number "β", a value of each bit at a remainder position when a position of the corresponding bit in the bitmap is divided by the base number "β". In other words, the index generating unit 113 sequentially sets, at from the zero-th bit to (base number-1)-th bit in the hashed bitmap, the bits from the zero-th bit in the hashed bitmap. Having set up to the (base number-1)-th bit, the index generating unit 113 folds the file axis again so as to set results obtained by OR operations from the zero-th bit. In other words, the index generating unit 113 sets, in the bitmap corresponding to the word code, "1" indicating the present at a bit corresponding to the file ID of the target file.

The encoding unit 112 determines whether or not it is an end point of the target file (Step S17). When determining that it is not the end point of the target file (Step S17: No), the encoding unit 112 shifts to Step S13 so as to read out the next word in the target file.

On the other hand, when determining that it is the end point of the target file (Step S17: Yes), the encoding unit 112 determines whether or not there exists any target file not encoded (Step S18). When determining that there exists a target file not encoded (Step S18: Yes), the encoding unit 112 shifts to Step S12 so as to encode the next target file.

When determining that there exists no target file not encode (Step S18: No), the index generating unit 113 stores, in the memory 120, the hashed index 124 obtained by collecting the generated hashed bitmaps (Step S19). The index generating unit 113 terminates the index generating process.

Processing Procedure of Encoding Process

Figure 12:
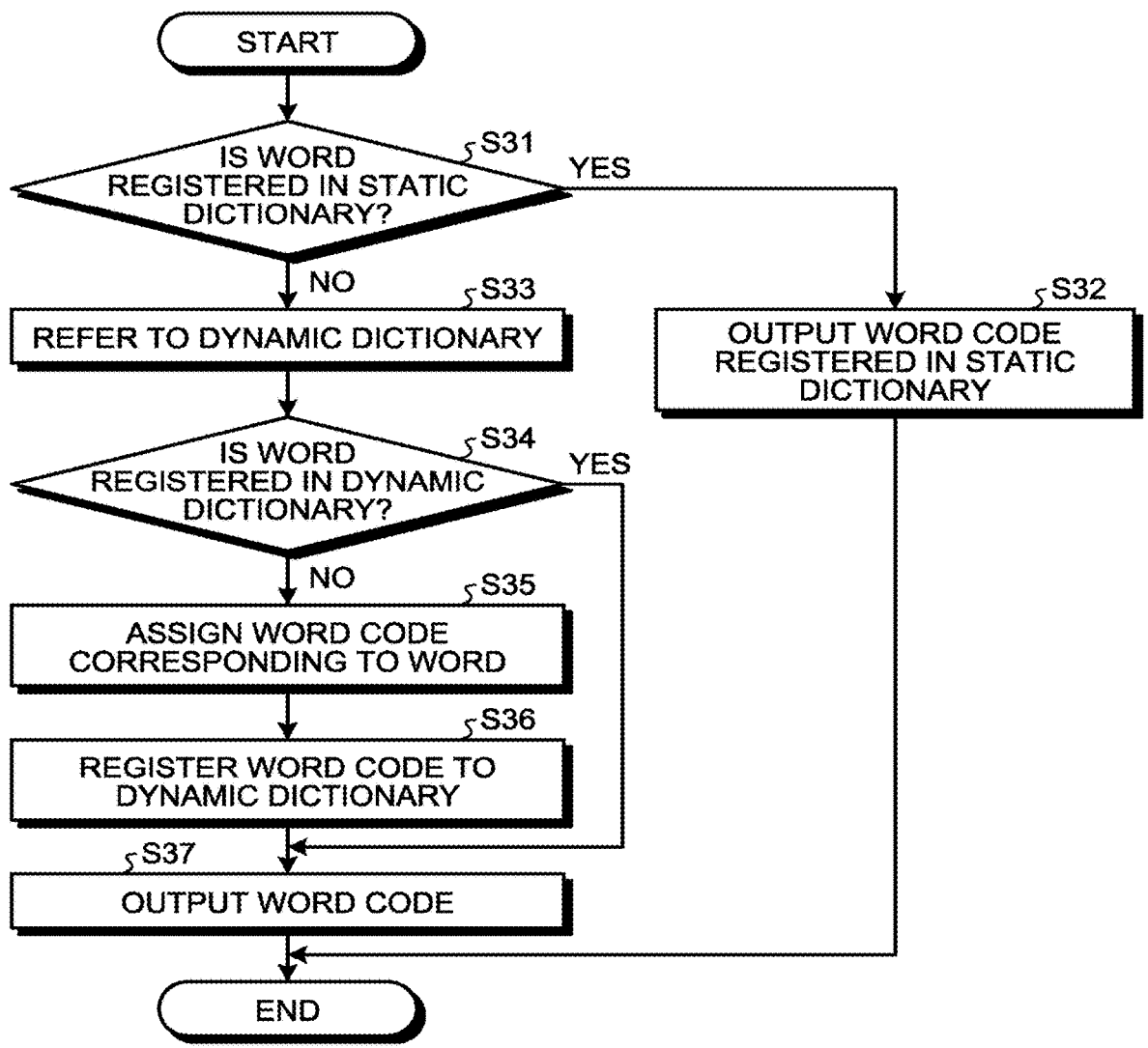
FIG. 12 is a flowchart illustrating one example of an encoding process according to the first embodiment.

Next, a processing procedure of the encoding process according to the first embodiment will be explained with reference to FIG. 12. FIG. 12 is a flowchart illustrating one example of the encoding process according to the first embodiment. The encoding unit 112 is assumed to have received a character string of a word.

As illustrated in FIG. 12, the encoding unit 112 having received the character string of the word determines whether or not the character string of the word is already registered in the static dictionary 121 (Step S31). When determining that the character string of the word is already registered in the static dictionary 121 (Step S31: Yes), the encoding unit 112 outputs a static code (word code) registered in the static dictionary 121 (Step S32). The encoding unit 112 terminates the encoding process.

On the other hand, when determining that the character string of the word is not already registered in the static dictionary 121 (Step S31: No), the encoding unit 112 refers to the dynamic dictionary 122 (Step S33). The encoding unit 112 determines whether or not the character string of the word is already registered in the dynamic dictionary 122 (Step S34). For example, the encoding unit 112 determines whether or not the character string of the word is already stored in the buffering unit D1 of the dynamic dictionary 122.

When determining that the character string of the word is already registered in the dynamic dictionary 122 (Step S34: Yes), the encoding unit 112 shifts to Step S37.

On the other hand, when determining that the character string of the word is not already registered in the dynamic dictionary 122 (Step S34: No), the encoding unit 112 assigns thereto a word code corresponding to this word (Step S35). For example, the encoding unit 112 acquires, from the external dictionary 123, a code corresponding to the character string of the word and an ID of the external dictionary 123 in which this word is registered. The encoding unit 112 assigns thereto the acquired code as a word code.

The encoding unit 112 registers the assigned word code to the dynamic dictionary 122 (Step S36). For example, the encoding unit 110 stores an assigned word code and an ID of the dictionary in which the word is registered in a record corresponding to a new dynamic code of the address table D2. In addition, the encoding unit 112 stores the character string of the word in the buffering unit D1, and further stores, in the record corresponding to the new dynamic code of the address table D2, a storage position where the character string of this word is stored and the length of the stored data. The encoding unit 112 shifts to Step S37.

In Step S37, the encoding unit 112 outputs the word code registered in the dynamic dictionary 122 (Step S37). For example, the encoding unit 112 encodes the character string of the word into a word code of the address table D2, which is associated with the character string this word. The encoding unit 112 outputs the encoded word code. The encoding unit 112 terminates the encoding process.

Processing Procedure of Index Updating Process

Figure 13:
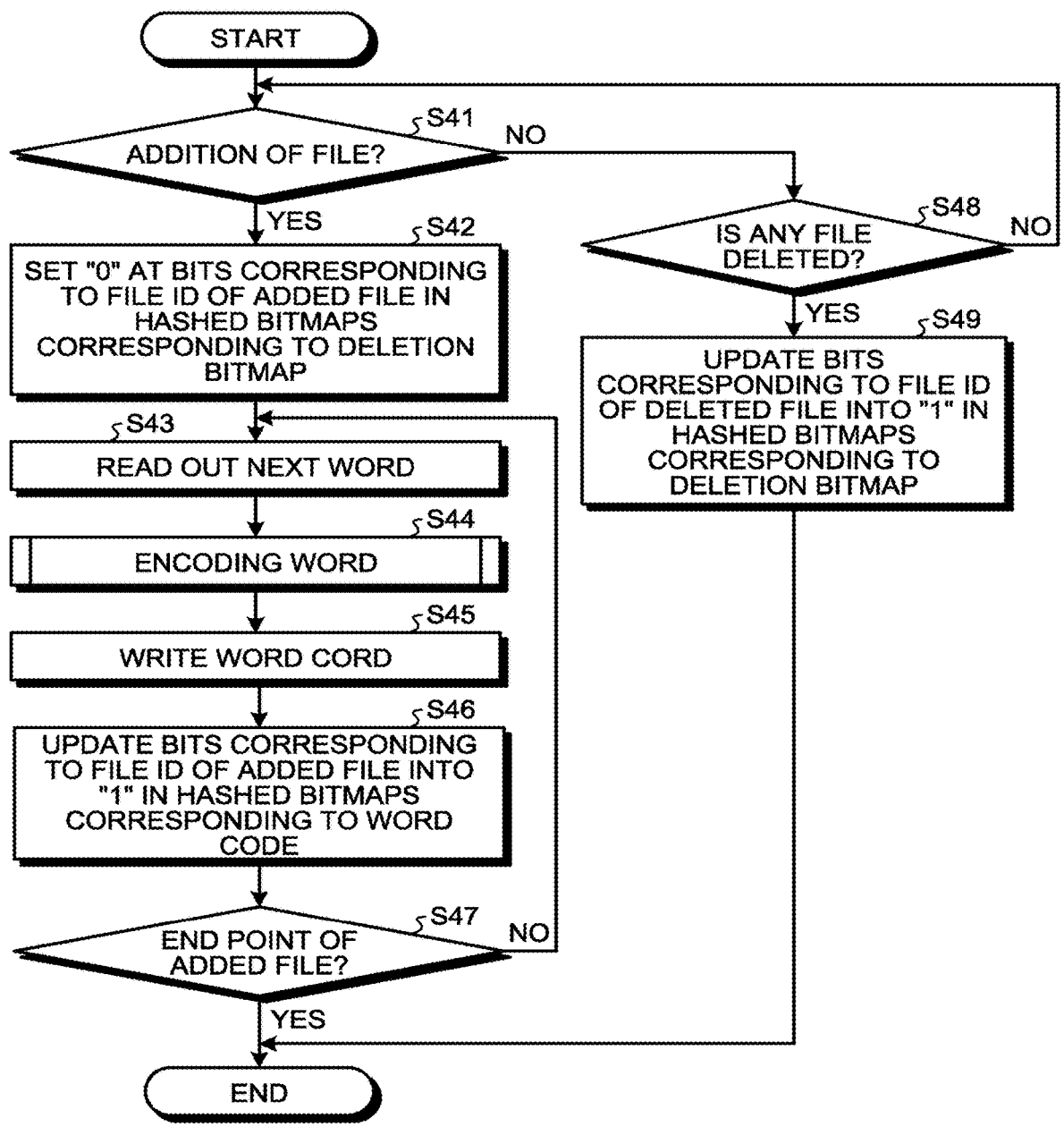
FIG. 13 is a flowchart illustrating one example of an index updating process according to the first embodiment.

Next, a processing procedure of the index updating process according to the first embodiment will be explained with reference to FIG. 13. FIG. 13 is a flowchart illustrating one example of the index updating process according to the first embodiment.

As illustrated in FIG. 13, the index updating unit 114 determines whether or not a file is added (Step S41). When determining that a file is added (Step S41: Yes), the index updating unit 114 sets, in hashed bitmaps corresponding to a deletion bitmap, "0" at bits corresponding to a file ID of the added file as a default value (Step S42).

Next, the index updating unit 114 reads out the character string of words of the added file (Step S43). For example, the index updating unit 114 executes lexical analysis on the added file, and reads out the character strings of the words as a lexically analyzed result from the head.

The index updating unit 114 encodes the read out words (Step S44). The explanation of the encoding process of the words has been already explained with reference to FIG. 12, and thus the explanation thereof is omitted. The index updating unit 114 writes, into a memory region for the encoded data corresponding to the added file, the word code output from the encoding process of the words (Step S45).

Next, the index updating unit 114 updates, in hashed bitmaps corresponding to the word code, bits at a file ID of the added file into "1" (Step S46). For example, the index updating unit 114 updates, for a hashed bitmap using the base number "α" corresponding to the word code, a value of a remainder position when a bit position of the bitmap corresponding to the added file ID is divided by "α" by using a value "1" obtained by an OR operation between a value "1" of the updated bit and the already set value "0". The index updating unit 114 updates, for a hashed bitmap using the base number "β" corresponding to the word code, a value of a remainder position when a bit position of the bitmap corresponding to the added file ID is divided by "β" by using a value "1" obtained by an OR operation between a value "1" of the updated bit and the already set value "0".

The index updating unit 114 determines whether or not it is an end point of the added file (Step S47). When determining that it is not the end point of the added file (Step S47: No), the index updating unit 114 shifts to Step S43 so as to read out the next word in the added file.

On the other hand, when determining that it is the end point of the added file (Step S47: Yes), the index updating unit 114 terminates the index updating process.

In Step S41, when determining that no file is added (Step S41: No), the index updating unit 114 determines whether or not any file is deleted (Step S48). When determining that no file is deleted (Step S48: No), the index updating unit 114 shifts to Step S41 so as to repeat the determination process.

On the other hand, when determining that a file is deleted (Step S48: Yes), the index updating unit 114 changes, in hashed bitmaps corresponding to a deletion bitmap, bits corresponding to a file ID of the deleted file into "1" (Step S49). For example, the index updating unit 114 updates, for a hashed bitmap using the base number "α" corresponding to the deletion bitmap, a value of a remainder position when a bit position of the bitmap corresponding to the deleted file ID is divided by "α" by using a value "1" obtained by an OR operation between a value "1" of the updated bit and the already set value. The index updating unit 114 updates, for a hashed bitmap using the base number "β" corresponding to the deletion bitmap, a value of a remainder position when a bit position of the bitmap corresponding to the deleted file ID is divided by "β" by using a value "1" obtained by an OR operation between a value "1" of the updated bit and the already set value. The index updating unit 114 terminates the index updating process.

Configuration of Retrieval Device

Figure 14:
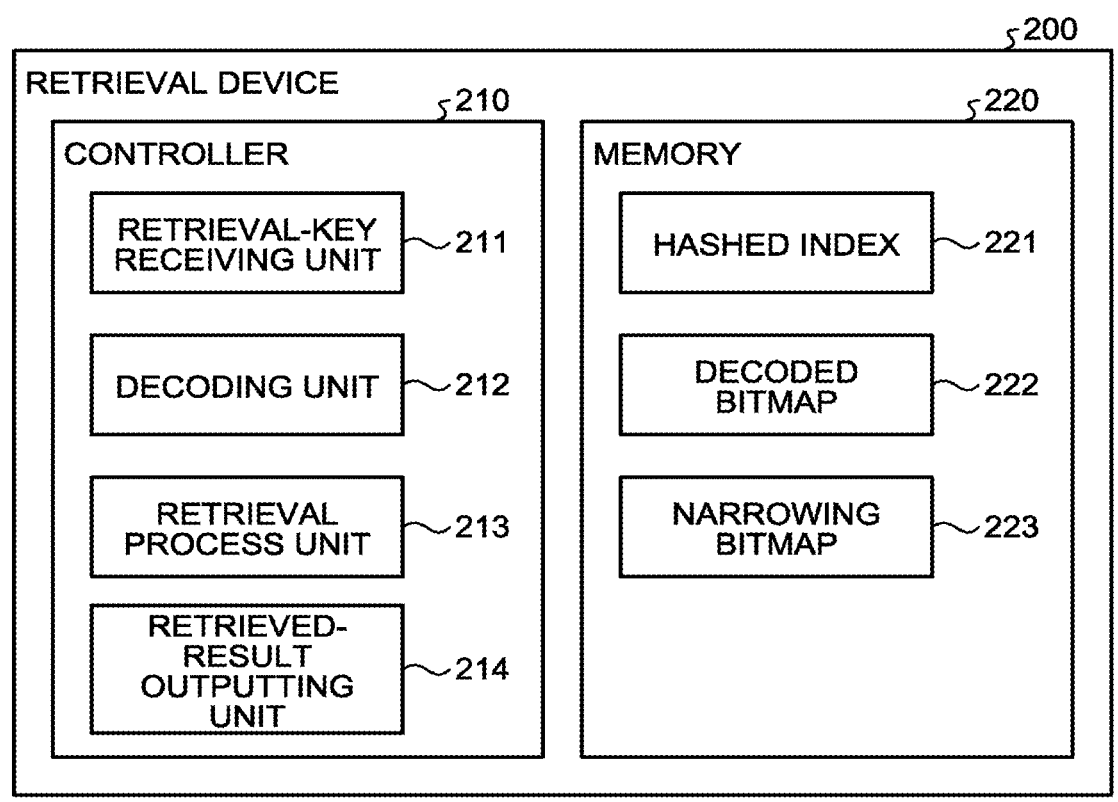
FIG. 14 is a functional block diagram illustrating a configuration of a retrieval device according to the first embodiment.

Next, a configuration of a retrieval device 200 according to the first embodiment, which executes the retrieval process, will be explained with reference to FIG. 14. FIG. 14 is a functional block diagram illustrating a configuration of the retrieval device according to the first embodiment. As illustrated in FIG. 14, the retrieval device 200 includes a controller 210 and a memory 220.

The controller 210 is a process unit that executes the retrieval process illustrated in FIG. 8. The controller 210 includes an internal memory for storing control data and programs that define various processing procedures so as to execute various processes by using them. The controller 210 corresponds to an electronic circuit of an integrated circuit such as an ASIC and a FPGA. Or, the controller 210 corresponds to an electronic circuit such as a CPU and a MPU. The controller 210 includes a retrieval-key receiving unit 211, a decoding unit 212, a retrieval process unit 213, and a retrieved-result outputting unit 214.

The memory 220 corresponds to a memory device that is, for example, a non-volatile semiconductor memory element such as a Flash Memory and an FRAM (Registered Trademark); and the like. The memory 220 includes a hashed index 221, a decoded bitmap 222, and a narrowing bitmap 223. Configurations of the hashed index 221 and the decoded bitmap 222 are similar to those of the respective hashed bitmap and bitmap corresponding to each word ID (see FIG. 2), and thus explanation thereof is omitted. A configuration of the narrowing bitmap 223 is similar to that of the bitmap corresponding to each word and the corresponding ANDed result (see FIG. 8), and thus explanation thereof is omitted.

The retrieval-key receiving unit 211 accepts a retrieval key. For example, the retrieval-key receiving unit 211 accepts a word to be retrieved as a retrieval key.

The decoding unit 212 decodes a plurality of hashed bitmaps corresponding to words to be retrieved. For example, the decoding unit 212 expands a plurality of hashed bitmaps corresponding to word IDs of the words to be retrieved into bitmaps, respectively (first decoding process). As one example, the base numbers are assumed to be "α" and "β". Herein, in a bitmap that is a decoding destination of a hashed bitmap using the base number "α", the decoding unit 212 sets a value of each bit in the hashed bitmap at a position where a position of the corresponding bit in the hashed bitmap is added to a value obtained by multiplying the base number "α" by an integral number (from "0"). In a bitmap that is a decoding destination of a hashed bitmap using the base number "β", the decoding unit 212 sets a value of each bit in the hashed bitmap at a position where a position of the corresponding bit in the hashed bitmap is added to a value obtained by multiplying the base number "β" by an integral number (from "0"). In other words, the decoding unit 212 sequentially sets, at from the zero-th bit in the bitmap of the decoding destination, bits from the zero-th bit in the hashed bitmap so as to process up to (base number-1)-th bit. The decoding unit 212 folds the file axis again so as to set values of the hashed bitmap from the zero-th bit of the hashed bitmap.

The decoding unit 212 executes an AND operation (second decoding process) between bits at the corresponding positions in the respective bitmaps expanded in the first decoding process. As one example, the decoding unit 212 executes an AND operation between the bitmap expanded form the hashed bitmap using the base number "α" and the bitmap expanded form the hashed bitmap using the base number "β". The decoding unit 212 stores a bitmap of the ANDed result in the decoded bitmap 222 as a decoded result. When the number of the words to be retrieved is two or more, the decoding unit 212 decodes hashed bitmaps for each of the words to be retrieved, and stores bitmaps in the decoded bitmap 222 as decoded results.

The decoding unit 212 decodes a hashed deletion bitmap. As one example, the decoding unit 212 executes the first and second decoding processes on the hashed deletion bitmap, and stores a deletion bitmap in the decoded bitmap 222 as a decoded result.

The retrieval process unit 213 retrieves a file in which a word to be retrieved exists. For example, the retrieval process unit 213 executes an AND operation between an inverted deletion bitmap and the bitmap stored in the decoded bitmap 222 held by the decoding unit 212, and stores the ANDed result in the narrowing bitmap 223.

The retrieved-result outputting unit 214 outputs the retrieved result by using the narrowing bitmap 223 stored by the retrieval process unit 213. For example, the retrieved-result outputting unit 214 outputs, as the retrieved result, a file ID whose bit in the narrowing bitmap 223 indicates "1".

Flowchart of Retrieval Process

Figure 15:
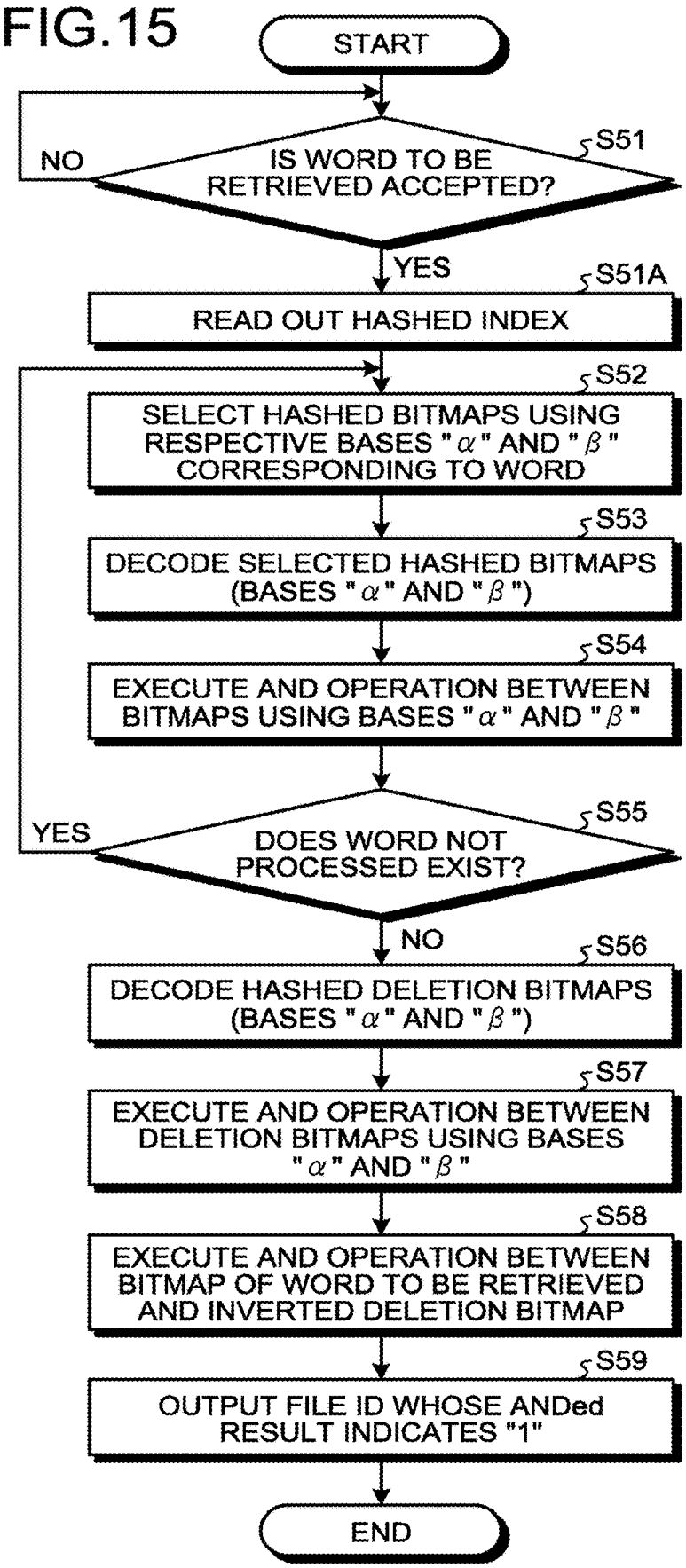
FIG. 15 is a flowchart illustrating one example of the retrieval process according to the first embodiment.

FIG. 15 is a flowchart illustrating one example of the retrieval process according to the first embodiment.

First, the retrieval-key receiving unit 211 determines whether or not a word to be retrieved is accepted (Step S51). When determining that the word to be retrieved is not accepted (Step S51: No), the retrieval-key receiving unit 211 repeats the determination process until it accepts a word to be retrieved.

On the other hand, when determining that a word to be retrieved is accepted (Step S51: Yes), the decoding unit 212 reads out the hashed index 221 from the memory 220 (Step S51A). The decoding unit 212 selects, from the read out hashed index 221, hashed bitmaps using the respective base numbers "α" and "β" corresponding to a word ID indicated by the word to be retrieved (Step S52).

The decoding unit 212 decodes the selected hashed bitmaps (Step S53). This decoding process is executed for each of the hashed bitmaps using the base numbers "α" and "β". In other words, the decoding unit 212 executes the first decoding process on the hashed bitmap using the base number "α". The decoding unit 212 executes the first decoding process on the hashed bitmap using the base number "β".

The decoding unit 212 executes an AND operation between the bitmap using the base number "α" and the bitmap using the base number "β" (Step S54). In other words, the decoding unit 212 executes the second decoding process by using the bitmap using the base number "α" and the bitmap using the base number "β", which are decoded by the first decoding process. The decoding unit 212 stores the ANDed result in the decoded bitmap 222.

The decoding unit 212 determines whether or not there exists a word not processed (Step S55). When determining that there exists a word not processed (Step S55: Yes), the decoding unit 212 shifts to Step S52 so as to process the next word of the retrieval target.

On the other hand, when determining that there exists no word not processed (Step S55: No), the decoding unit 212 decodes hashed deletion bitmaps (Step S56). This decoding process is executed for each of the hashed deletion bitmaps using the respective base numbers "α" and "β". In other words, the decoding unit 212 executes the first decoding process on the hashed deletion bitmap using the base number "α". The decoding unit 212 executes the first decoding process on the hashed deletion bitmap using the base number "β".

The decoding unit 212 executes an AND operation between the deletion bitmap using the base number "α" and the deletion bitmap using the base number "β" (Step S57). In other words, the decoding unit 212 executes the second decoding process by using the bitmaps using the respective base numbers "α" and "β", which are decoded by the first decoding process. The decoding unit 212 stores the ANDed result in the decoded bitmap 222.

The retrieval process unit 213 executes an AND operation between the bitmap of the word to be retrieved and the deletion bitmap (Step S58). For example, a computing process unit 213 executes an AND operation between each bit in the bitmap stored in the decoded bitmap 222 and the corresponding bit in the inverted deletion bitmap. The computing process unit 213 stores the ANDed result in the narrowing bitmap 223.

The retrieved-result outputting unit 214 outputs a file ID whose bit of the ANDed result indicates "1" as a retrieved result (Step S59). For example, the retrieved-result outputting unit 214 outputs, as a retrieved result, a file ID whose bit indicates "1" by using an ANDed result stored in the narrowing bitmap 223.

Thus, the encoding device 100 encodes a target file by using the static dictionary 121 and the dynamic dictionary 122. The encoding device 100 generates index information of the target file by folding a file axis and a word axis of the index information of the target file utilizing base numbers, respectively, the index information indicating presence information words registered in the static dictionary 121 and the dynamic dictionary 122 in the target file. The encoding device 100 generates difference information of the index information when the target file is updated, the difference information indicating difference of the index information with respect to the file axis direction or the word axis direction. By employing this configuration, the encoding device 100 can easily update the index information that indicates presence information in the files in accordance with update of a file. In other words, the encoding device 100 generates the difference information between index information before update and that after the update in accordance with the update of the file, and thus only the different part can be updated in the index information. For example, when a file is added, the encoding device 100 generates presence information information of a word in the added file as difference information corresponding to index information on between before and after the addition, and thus only the difference information can be updated in the index information. Moreover, even when a word referred to as a new word or a vogue word is included in the file, the encoding device 100 can update the difference information to be able to update the index information without generating index information again.

[b] Second Embodiment

Meanwhile, in the first embodiment, the encoding device 100 targets the plurality of bitmap-type indexes BI to generate the hashed indexes HI on the basis of the respective plurality of bitmap-type indexes BI. In a case where a file is updated, the encoding device 100 updates, for the hashed index HI taking charge of the updated file, this hashed index HI by using difference information of a bitmap corresponding to the updated file from a bitmap before the update. The encoding device 100 may hierarchize the plurality of bitmap-type indexes BI.

Therefore, in a second embodiment, the case will be explained, in which the encoding device 100 hierarchizes the bitmap-type indexes BI.

Hierarchization of Bitmap-Type Indexes

Figure 16:
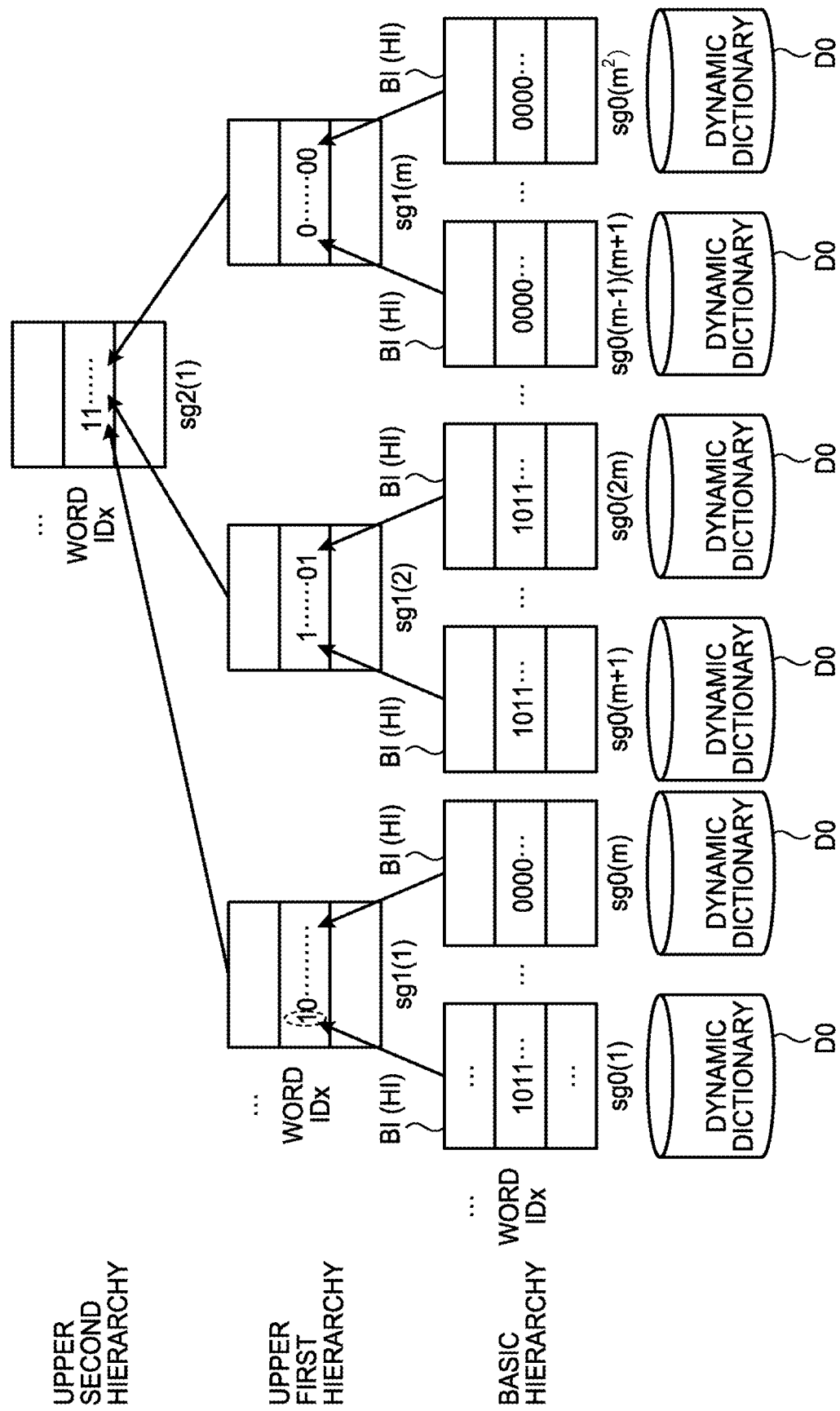
FIG. 16 is a diagram illustrating one example of hierarchization of bitmap-type indexes according to a second embodiment.

FIG. 16 is a diagram illustrating one example of hierarchization of bitmap-type indexes according to the second embodiment. As illustrated in FIG. 16, the bitmap-type index BI is divided by "n" that is a predetermined number of files. Herein, "n" is 256, for example. Each of the divided indexes is referred to as a segment.

The segment sg0(1) is a segment including the bitmap-type index BI of target files f1 to fn. The segment sg0(2) is a segment including the bitmap-type index BI of target files f(n+1) to f(2n). The segment sg0(3) is a segment including the bitmap-type index BI of target files f(2n+1) to f(3n).

In an initial state, there exists only the segment sg0(1) as a segment, when the number of the files exceeds "n" caused by addition of a file, the segment sg0(2) is generated, when the number of the files exceeds "2n", the segment sg0(3) is generated.

The bitmap-type index BI of each of the segments includes a bitmap whose words are the same. However, file IDs taken charge of by the index differ from each other. The file IDs taken charge of by the bitmap-type index BI of each of the segments are file IDs of the encoded files held by the corresponding segment. For example, the bitmap-type index BI of the segment sg0(1) includes a bit string indicating the presence information of file IDs "1" to "n" in a bitmap of each word. The bitmap-type index BI of the segment sg0(m) includes a bit string indicating the presence information of file IDs "(m−1)n" to "mn" in a bitmap of each of the words.

The dynamic dictionary D0 is a dictionary that associates respective words not registered in the static dictionary S0 but registered in the external dictionary E0, codes in the external dictionary E0, and dynamic codes assigned dynamically with one another. Namely, when a code corresponding to a character string of the word does not exist in the static dictionary S0, the encoding device 100 acquires, from the external dictionary E0, a code (word code) corresponding to the character string of the word and an ID of the external dictionary E0 in which this word code is registered. The encoding device 100 registers, in the dynamic dictionary D0, the character string of the word, the code (word code) acquired from the external dictionary E0, and the dynamic code assigned dynamically. The dynamic dictionary D0 according to the first embodiment is generated by file unit. However, the dynamic dictionary D0 may be generated by file unit or by segment unit. In FIG. 16, the dynamic dictionary D0 is generated by segment unit.

Herein, when the number of the segments increases, bitmaps become redundant for respective word IDs. When the bitmaps become redundant, ON/OFFs of respective bits indicating presence information are needed to be checked with respect to all the number of the files for respective word IDs, it is no use checking parts of not existing (OFF). Therefore, bitmaps are to be aggregated by "m" when "m+1" segments are generated for each word ID.

In FIG. 16, for example, the case in which bitmaps of the word IDx indicated by a word "x" is aggregated in an upper hierarchy will be explained as an example. Herein, X of "sgX(Y)" indicates a hierarchy number, and Y indicates a segment number. Therefore, sgX(Y) indicates the Y-th segment in the X-th hierarchy. The segments sg0(1) to sg0(m) having been explained are segments of a zero hierarchy that is a basic hierarchy.

First, an aggregation example from a zero hierarchy of a basic hierarchy to a first hierarchy of an upper hierarchy will be explained. As a rule of the aggregation, when a bit string that is a bitmap of a segment in a target hierarchy is all-zero, namely, the word "x" does not exist in a target file group in the segment, the segment is aggregated into "0" as an index of an upper hierarchy. On the other hand, at least one "1" exists in a bit string that is a bitmap of a segment in a target hierarchy, namely, the word "x" exists in a target file group in the segment, the segment is aggregated into "1" as an index of the upper hierarchy.

For example, "1" exists in the segment sg0(1), "1" is set in the segment sg1(1) of the upper hierarchy. Similarly, the segment sg0(m) is all-zero, "0" is set in the segment sg1(1) of the upper hierarchy. Bit positions of a bitmap in the segment sg1(1) in this upper hierarchy indicates positions of the lower segments sg0(1) to sg0(m). Thus, states of the bitmap in the lower segment can be specified by using a bit value in a segment in an upper hierarchy.

Such an aggregation is executed not only between the zero hierarchy and the first hierarchy, when the number of the segments becomes "m" in an uppermost hierarchy, a segment of an upper hierarchy is newly generated. For example, when segments are generated up to the segment sg1(m) in the first hierarchy, the segment sg2(1) of the second hierarchy is generated. In FIG. 16, the example up to the second hierarchy is illustrated, may be aggregated into a hierarchy of equal to or more than third hierarchy in accordance with increase in the data scale.

In FIG. 16, each of the segments in the basic hierarchy is stored in the hashed state. In other words, the encoding device 100 generates a hashed index HI from the bitmap-type index BI indicated by the segment taken charge of by this encoding device 100 so as to store the generated hashed index HI. In a case where a file is added, the encoding device 100 updates the hashed index HI taking charge of the added file by using difference information of a bitmap corresponding to the added file from the bitmap before the addition. During the update, the encoding device 100 aggregates the bitmap corresponding to the word "x" to be updated into "1" as an index of an upper hierarchy at a timing when "1" is set in this bitmap for the first time.

Hierarchization of Deletion Bitmaps

Figure 17:
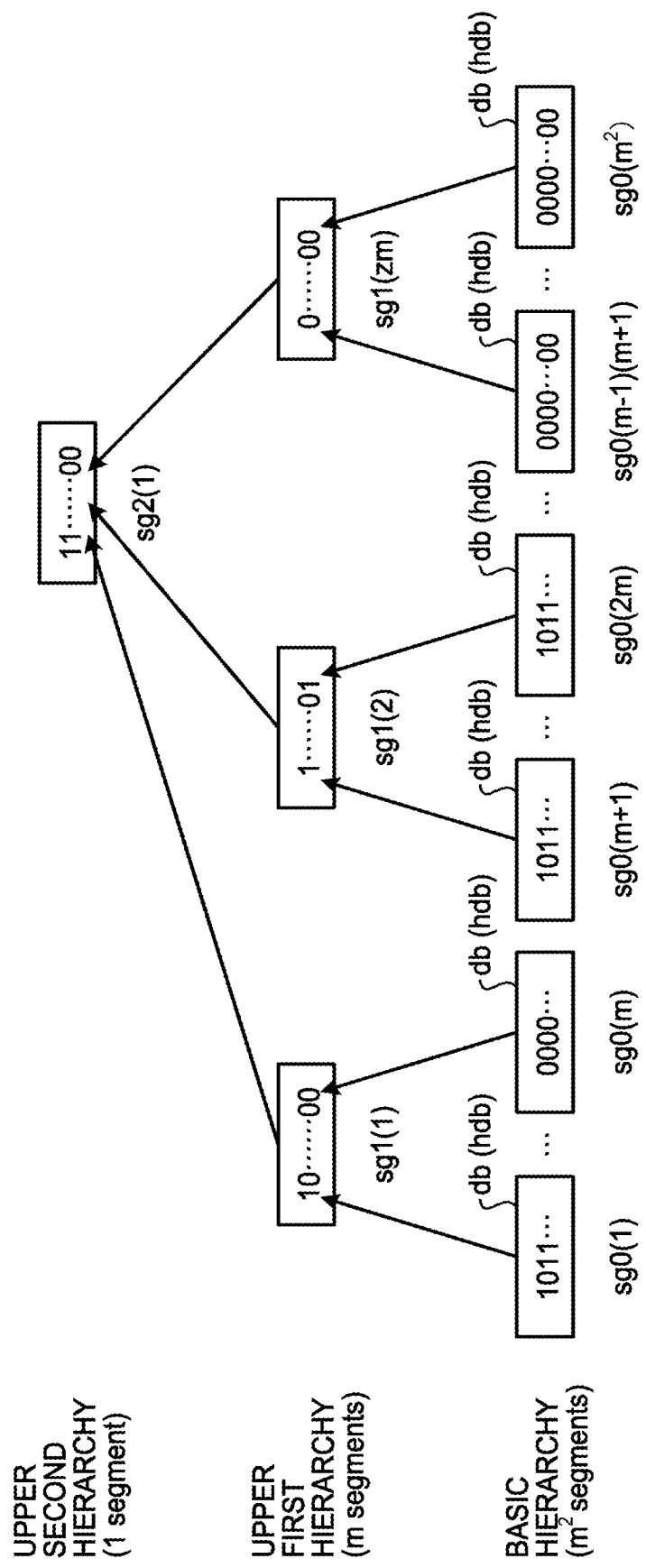
FIG. 17 is a diagram illustrating one example of hierarchization of deletion bitmaps according to the second embodiment.

FIG. 17 is a diagram illustrating one example of hierarchization of deletion bitmaps according to the second embodiment. As illustrated in FIG. 17, similarly to FIG. 16, the deletion bitmaps db are also aggregated into an upper hierarchy by segment unit.

Each segment of the deletion bitmap bd in a basic hierarchy is also stored in a hashed state. In other words, the encoding device 100 generates, in a segment taken charge of by this encoding device 100, hashed bitmaps hbd from the deletion bitmap bd so as to store the generated hashed bitmaps hbd. In a case where a file is deleted, the encoding device 100 updates, for the hashed bitmaps hbd taking charge of the deleted file, difference information between after and before the deletion. During the update, the encoding device 100 aggregates, into "0" as an index of an upper hierarchy, the corresponding hashed bitmap hbd at a timing when all of the bits in this bitmap become "0". On the other hand, in a case where a file is added, the encoding device 100 updates the hashed bitmap hbd taking charge of the added file by using difference information between before and after the addition. During the update, the encoding device 100 aggregates, into "1" as an index of an upper hierarchy, the hashed bitmap hbd at a timing when "1" is set in this bitmap for the first time.

One Example of Bitmap-Type Index Updating Process

Figure 18:
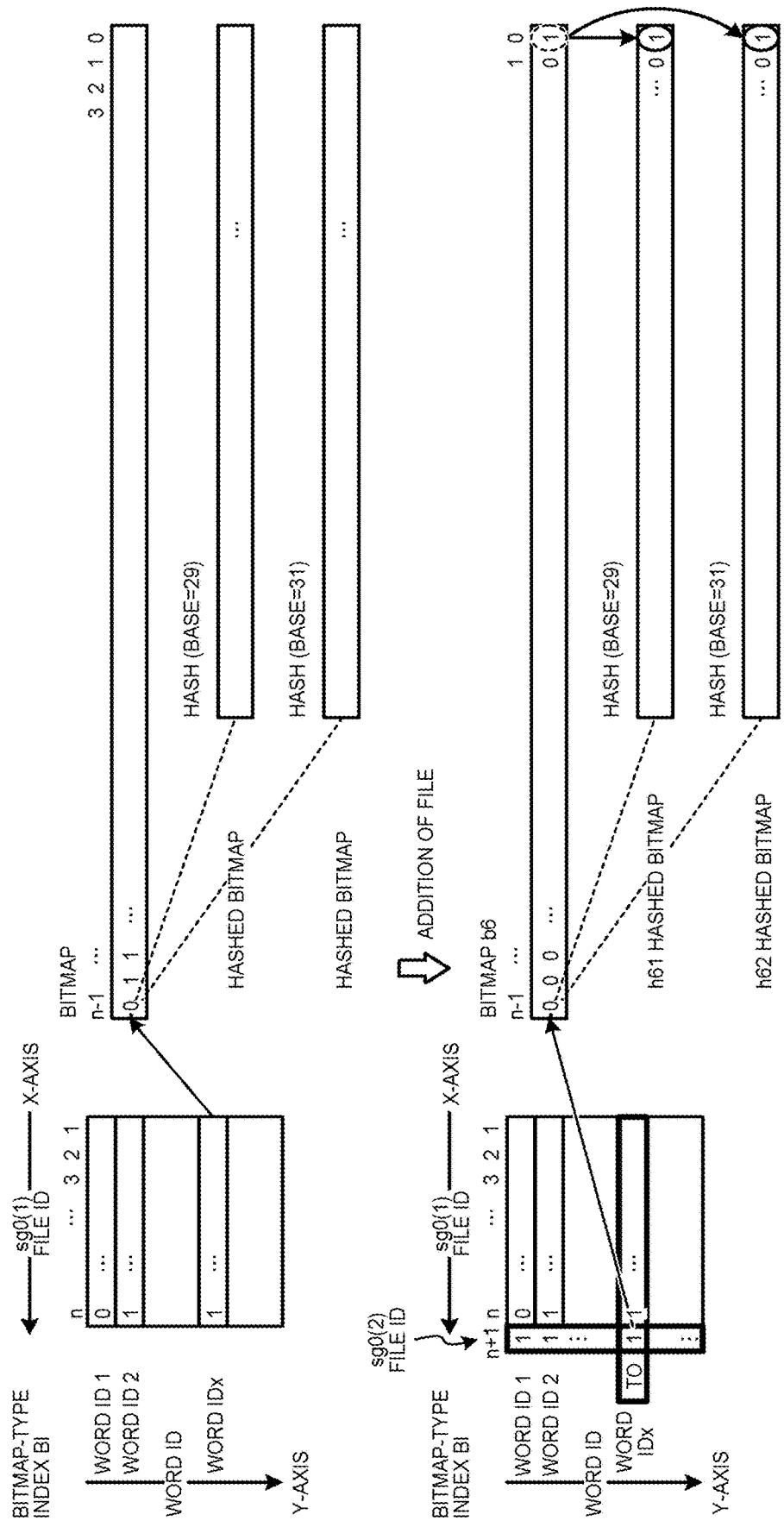
FIG. 18 is a diagram illustrating one example of a bitmap-type index updating process according to the second embodiment.

FIG. 18 is a diagram illustrating one example of a bitmap-type index updating process according to the second embodiment. As illustrated in an upper part of FIG. 18, a segment sg0(1) is already registered, and hashed index information on file IDs "1" to "n" is stored in the bitmap-type index BI of word IDs "1" to "x".

An lower part of FIG. 18 indicates a state where a new file "n+1" is added form the state illustrated in the upper part of FIG. 18. The segment sg0(1) that is the last segment in the upper part of FIG. 18 is not be able to store the file "n+1", and thus a new segment sg0(2) is set so that the file "n+1" is stored in the segment sg0(2).

In the bitmap-type index BI of the segment sg0(2), a bit with respect to the file "n+1" is set for each of the word IDs. In the example of the lower part of FIG. 18, "1" is set at the word IDs "1" and "2", and "1" is set at the word IDx. The encoding device 100 hashes, as one example, each bitmap in the new segment sg0(2) on the basis of hash values (base numbers) of "29" and "31". Specifically, a zero-th bit of a bitmap b6 corresponds to the file ID "n+1". The encoding device 100 sets, at a remainder position in a hashed bitmap h61 using the base number "29" when a position of the zero-th bit in the bitmap b6 is divided by the base number "29", a value at the zero-th bit in this bitmap. The encoding device 100 sets, at a remainder position in a hashed bitmap h62 using the base number "31" when a position of the zero-th bit in the bitmap b6 is divided by the base number "31", a value at the zero-th bit in this bitmap. As a result, even when a file whose file ID is "n+1" is added, the encoding device 100 updates hashed bitmaps while targeting presence information of words in the added file, and thus only the difference between the bitmaps can be updated.

One Example of Retrieval Process Using Hierarchized Segment Groups

Figure 19:
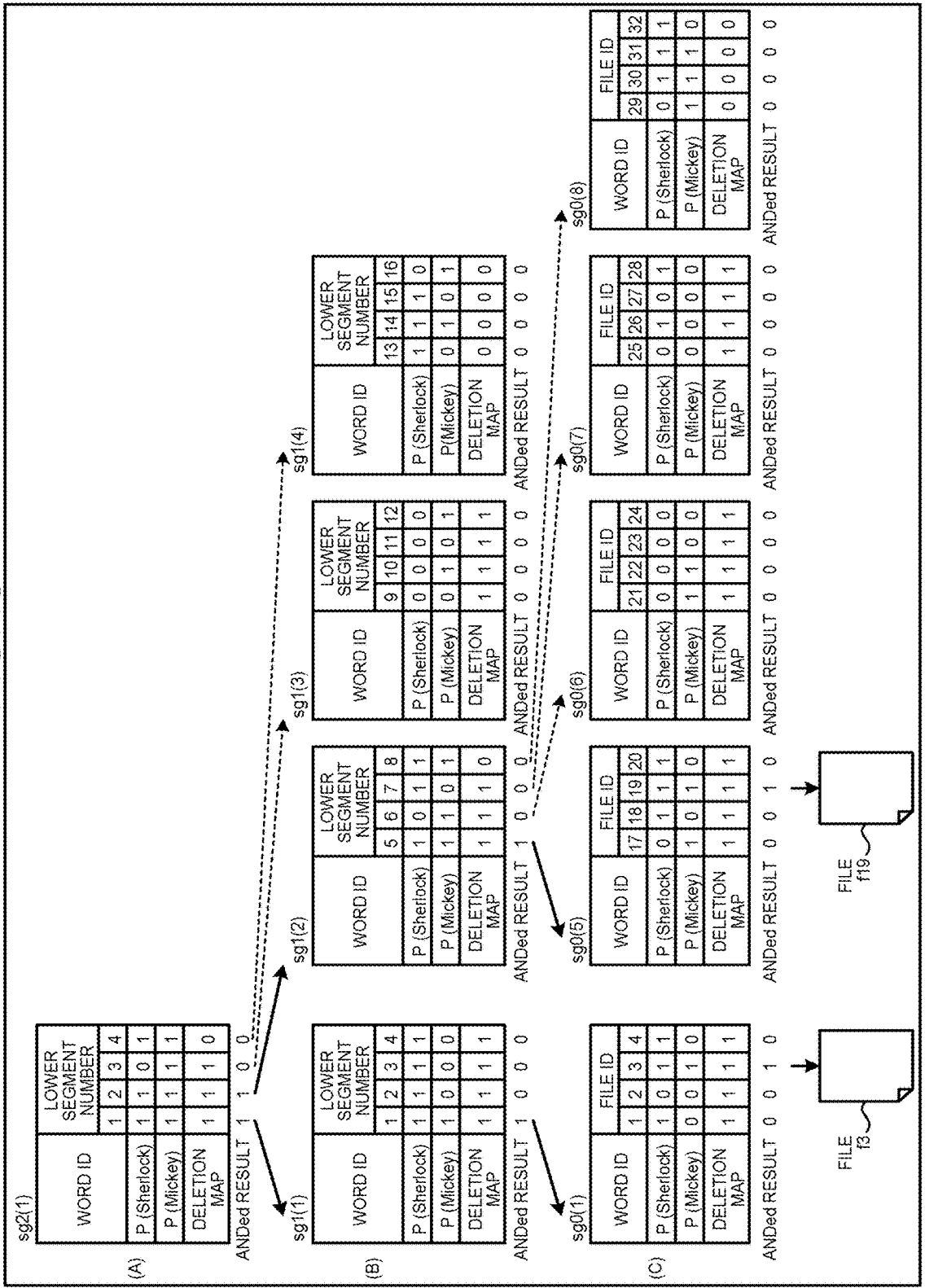
FIG. 19 is a diagram illustrating one example of a retrieval process using hierarchized segment groups.

FIG. 19 is a diagram illustrating one example of a retrieval process using hierarchized segment groups. In FIG. 19, for simplification of the explanation, "n" is set to be four which is the numbers of files of each segment in a zero hierarchy and "m" is set to be four. Therefore, the segments exist from sg0(1) up to sg0(16) in the zero hierarchy, however, the explanation of the not illustrated segments is omitted. In FIG. 19, the uppermost hierarchy is explained to be a second hierarchy. In FIG. 19, solid-line arrows indicate that segments of lower hierarchies are specified in accordance with ANDed results, and dotted-line arrows are not actually specified, however, illustrated for comparison with the specified segments. In FIG. 19, the case is assumed that "SherlockΔMickey" is input as a character string for retrieval. P(s) is assumed to indicate a word ID of a word "s". A deletion map illustrated in FIG. 19 is an abbreviated name of the "deletion bitmap", and indicates deleted in a case of "0" and not deleted in a case of "1".

In (A), for a segment sg2(1) of the second hierarchy that is the uppermost hierarchy, an AND operation between a bitmap of P(Sherlock) indicating a word ID of a word "Sherlock", a bitmap of P(Mickey) indicating a word ID of a word "Mickey", and an aggregated deletion map is executed. The ANDed result is "1100", and thus it is found that there exists the probability the words "Sherlock" and "Mickey" exist in the segments sg1(1) and sg1(2) in a first hierarchy that is a lower hierarchy.

In the segment sg2(1) in the second hierarchy that is the uppermost hierarchy, the ANDed results of lower segment numbers 3 and 4 are "0". Therefore, without executing AND operations of the respective segments sg1(3) and sg1(4), it is found that ANDed results of the respective segments sg1(3) and sg1(4) are all-zero.

In (B), because the segments sg1(1) and sg1(2) in the first hierarchy are specified from the ANDed results of the second hierarchy, AND operations similar to those of (A) are executed on the segments sg1(1) and sg1(2). Thus, the segment sg0(1) is specified from the segment sg1(1), and the segment sg0(5) is specified from the segment sg1(2). Focusing on the segment sg1(2), ANDed results of lower segment numbers 6 to 8 are "0". Therefore, without executing AND operations of the respective segments sg0(6) to sg0(8), it is found that ANDed results of the respective segments sg0(6) to sg0(8) are all-zero.

In (C), segments sg0 (1) and sg0 (5) are specified in the zero hierarchy from the ANDed results in the first hierarchy, and AND operations are executed on the segments sg0 (1) and sg0 (5) similarly to the aforementioned (A) and (B). In other words, the retrieval device 200 decodes hashed bitmaps corresponding to the word ID of the word "Sherlock", and outputs the bitmap of the P(Sherlock) as decoded results. The retrieval device 200 decodes hashed bitmaps corresponding to the word ID of the word "Mickey", and outputs the bitmap of the P(Mickey) as decoded results. The retrieval device 200 decodes hashed deletion bitmaps, and outputs the deletion bitmap as decoded results. The retrieval device 200 executes an AND operation on the segment sg0(1) between the bitmap of P(Sherlock), the bitmap of P(Mickey), and the deletion bitmap. The retrieval device 200 executes an AND operation on the segment sg0(5) between the bitmap of P(Sherlock), the bitmap of P(Mickey), and the deletion bitmap. Thus, a file ID "3" is specified from the segment sg0(1), and a file ID "19" is specified from the segment sg0(5). Therefore, it is found that both of the words "Sherlock" and "Mickey" exist in each of the files f3 and f19.

Figure 20:
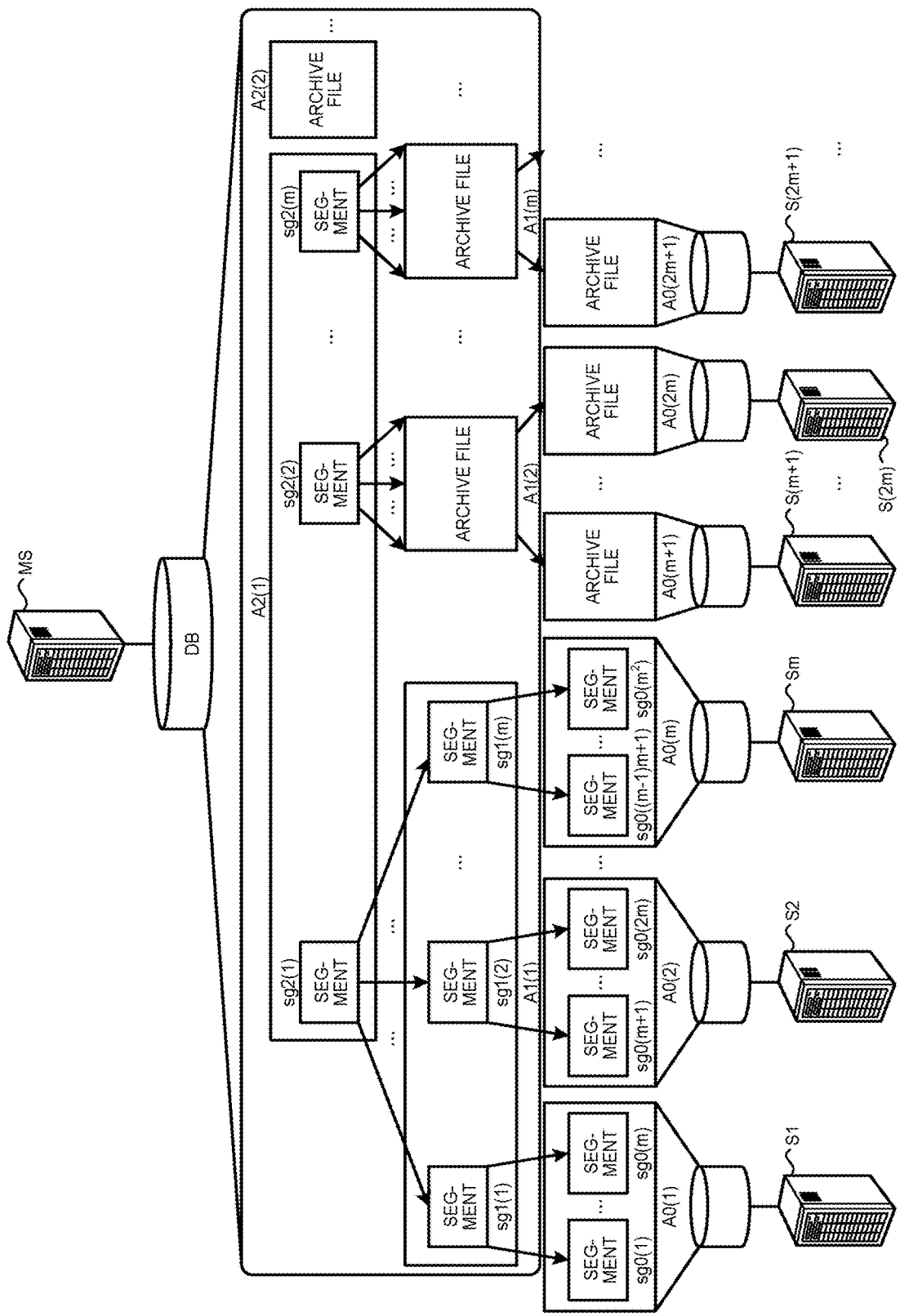
FIG. 20 is a diagram illustrating a configuration example of a computer system in which the hierarchized segment groups are implemented.

Configuration Example of Computer System in which Hierarchized Segment Groups are Implemented FIG. 20 is a diagram illustrating a configuration example of a computer system in which the hierarchized segment groups are implemented. In FIG. 20, one archive file is assumed to include "m" segments. "AX(Y)" is a code of an archive file, "X" indicates a hierarchy number, and "Y" indicates an archive number. Therefore, "AX(Y)" indicates the Y-th archive file of the X-th hierarchy. For example, an archive file A0(1) is an aggregation of the segments sg0(1) to sg0(m) in a zero hierarchy.

In an example illustrated in FIG. 20, a master server MS stores archive files of equal to or upper than the first hierarchy. Each of the slave servers S1, S2, . . . , S(2m+1), . . . stores one archive file assigned by the master server MS. Each of the slave servers corresponds to, for example, the encoding device 100 and the retrieval device 200. The number of assigned archive files illustrated in FIG. 20 is one, the master server MS is not needed to take charge of all of the archive files of equal to or upper than the first hierarchy, and may be distributed to another server. At least one of the slave servers S1, S2, . . . , S(2m+1) . . . , may take charge of, not one archive file, but a plurality of archive files.

Therefore, the computer system including the encoding device 100 and the retrieval device 200 executes encoding and hierarchization on the basis of codes (word codes) corresponding to, for example, specialized words, new words, and unknown words, and thus the performance of all of the slave servers is easily improved. In other words, the computer system can perform scale-out. Specifically, the master server MS can refer to ANDed results in the archive files taken charge of, and can assign the slave server to the segment so that the loads become even.

Other Embodiment Associated with Aforementioned Embodiments

Herein, a modified part of the aforementioned embodiment will be explained. Not only the following modification, but also design changes within a range of the main ideas of the present disclosure may be properly performed.

The encoding device 100 according to the embodiment is assumed to be of a 32-bit register, and is explained to hash each of the bitmaps on the basis of the hash values (base numbers) of "29" and "31". However, the hash values (base numbers) of "29" and "31" are merely one example and not limited thereto. The two hash values (base numbers) may be decided in accordance with the number of kinds of words in respective plurality of files. For example, when the number of kinds of words is "10000", two base numbers are selected so that two-dimensional matrices indicated by remainders divided one base number and remainders divided the other base number is approximately "10000". It is sufficient that the two base numbers are adjacent prime numbers. When the number of the matrices is "10000", two prime numbers to be selected are, as one example, "97" and "101". It is on the basis of the assumption that, in a two-dimensional matrix space whose lowest common multiple is approximately "10000", the combination of remainders obtained by one and the other hashes with respect to a word will not collide (duplicate) with the combination of remainders with respect to another word.

In the embodiment, the encoding device 100 is explained to generate hashed bitmaps on the basis of two hash values (base numbers) for each of the bitmaps corresponding to a respective plurality of word IDs. When generating a hashed bitmap, the encoding device 100 detects a collision (hash noise) of hashes in some cases. For example, because a super-high frequency word exists in a plurality of files, bit values at a plurality of positions in a bitmap corresponding to the super-high frequency word are set "1". When the bitmap is hashed, "1" is redundantly set at the same position in the hashed bitmap in some cases. As one example, the super-high frequency words include "the" and "on". Therefore, the encoding device 100 may execute collision monitoring of hashes on the hash noise to execute reduction in hash-noise by measuring the 0/1 ratio or dividing of the bitmaps. For example, when collisions are continuously generated in any one of the hashed bitmaps, the encoding device 100 tallies ratios of presence/absence (1/0) by using presence information in the bitmap of the word ID corresponding to the hashed bitmap in which the collision is generated. When the ratio of "1" is larger than a threshold, the encoding device 100 divides the bitmap of the word ID corresponding to the hashed bitmap in which the collision is generated. Specifically, the encoding device 100 extracts bits at even-numbered positions in the bitmap of the word ID corresponding to the hashed bitmap in which the collision is generated so as to newly generate a bitmap. In addition, the encoding device 100 extracts bits at odd-numbered positions in the bitmap of the word ID corresponding to the hashed bitmap in which the collision is generated so as to newly generate a bitmap. The encoding device 100 stores the new divided bitmaps in, for example, a region of low frequency words as division destinations. The encoding device 100 sets the division destination for any one of the two hashed bitmaps. After the division of the bitmap, the encoding device 100 generates hashed bitmaps based on two hash values (base numbers) for the bitmap of the division destination. Thus, even when data of the hashed bitmap collide, the encoding device 100 divides even-numbered data and odd-numbered data of the bitmap before hashing from each other so as to respectively hash them, and thus it is possible to prevent the collision of data.

The encoding device 100 according to the embodiment is explained to generate the hashed index to which two-dimensional (word and file axes) hashing is applied on the basis of a plurality of adjacent hash values (base numbers). However, the encoding device 100 may employ a block axis instead of the file axis. In other words, presence information of the word IDs may be a block unit.

The information including the processing procedures, the control procedures, the specific appellations, and various data and parameters, which are indicated in the embodiment, may be arbitrarily changed without the case of special notes.

Hardware Configuration

Figure 21:
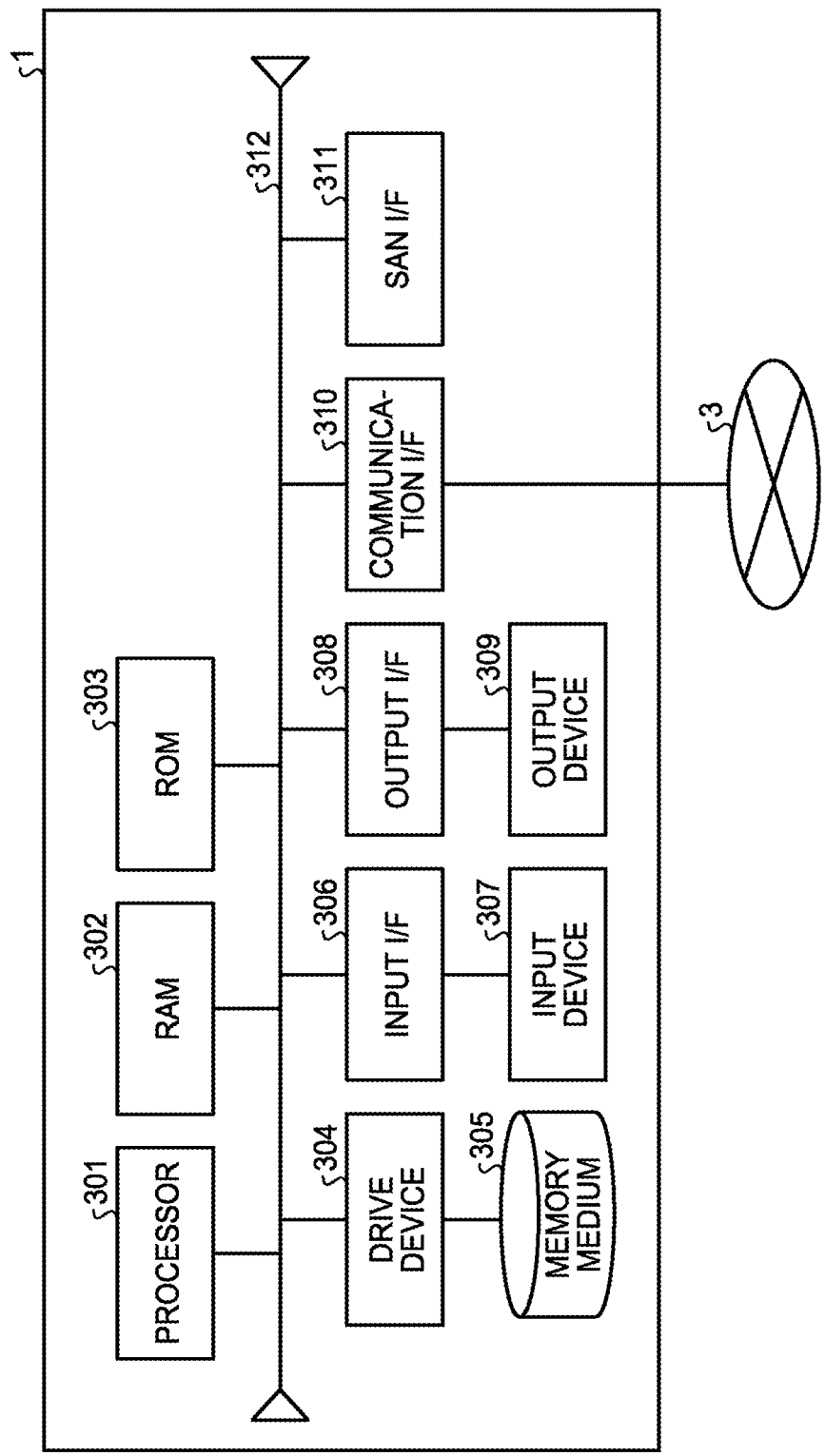
FIG. 21 is a diagram illustrating a hardware configuration example of a computer.

Hereinafter, the hardware and software to be used in the aforementioned embodiments will be explained. FIG. 21 is a diagram illustrating a hardware configuration example of a computer 1. The computer 1 includes, for example, a processor 301, a Random Access Memory (RAM) 302, a Read Only Memory (ROM) 303, a drive device 304, a memory medium 305, an input interface (I/F) 306, an input device 307, an output interface (I/F) 308, an output device 309, a communication interface (I/F) 310, a Storage Area Network interface (SAN I/F) 311, a bus 312, etc. The pieces of the hardware are connected with one another via the bus 312.

The RAM 302 is a memory device to be read out and written into, and a semiconductor memory such as a Static RAM (SRAM) and a Dynamic RAM (DRAM); a Flash Memory not the RAM; etc. may be used. The ROM 303 includes a Programmable ROM (PROM) and the like. The drive device 304 is a device that executes at least one of reading out and writing into of the information registered in the memory medium 305. The memory medium 305 memorizes information that is written into by the drive device 304. The memory medium 305 includes, for example, a hard disk; a Flash Memory such as a Solid State Drive (SSD); and a memory medium such as a Compact Disc (CD), a Digital Versatile Disc (DVD), and a Blu-ray Disc. In the computer 1, for example, the drive device 304 and the memory medium 305 are provided with respect to each of a plurality of kinds of the memory mediums.

The input interface 306 is a circuit that is connected to the input device 307, and transmits an input signal received from the input device 307 to the processor 301. The output interface 308 is a circuit that is connected to the output device 309, and causes the output device 309 to execute outputting in accordance with an instruction of the processor 301. The communication interface 310 is a circuit that executes control of communication via the network 3. The communication interface 310 is, for example, a Network Interface Card (NIC), etc. The SAN interface 311 is a circuit that executes control of communication with a memory device connected to the computer 1 by a storage area network. The SAN interface 311 is, for example, a Host Bus Adopter (HBA) and the like.

The input device 307 is a device that transmits input signals in accordance with operations. The input device 307 includes a key device such as a keyboard and buttons provided on a body of the computer 1; and a pointing device such as a mouse and a touch panel. The output device 309 is a device that outputs information in accordance with control of the computer 1. The output device 309 includes an image outputting device (display device) such as a display; and a sound outputting device such as a speaker. For example, an input/output device such as a touch screen is used as the input device 307 and the output device 309. The input device 307 and the output device 309 may be integrated with the computer 1, or may be a device that is not integrated with the computer 1 and, for example, is externally connected to the computer 1.

For example, the processor 301 reads out a program memorized in the ROM 303 and the memory medium 305 to the RAM 302, and executes a process of the controllers 110 and 210 in accordance with a procedure of the read out program. In this case, the RAM 302 is used as a work area of the processor 301. The ROM 303 and the memory medium 305 memorizes program files (application program (AP) 24, middleware (MW) 23, Operating System (OS) 22 to be mentioned later, etc.) and data files (for example, static dictionary 121, dynamic dictionary 122, external dictionary 123, bitmap-type index 124, hashed index 125, etc.), and the RAM 302 is used as a work area of the processor 301, and thus functions of the memories 120 and 220 are realized. The program to be read out by the processor 301 will be explained with reference to FIG. 22.

Figure 22:
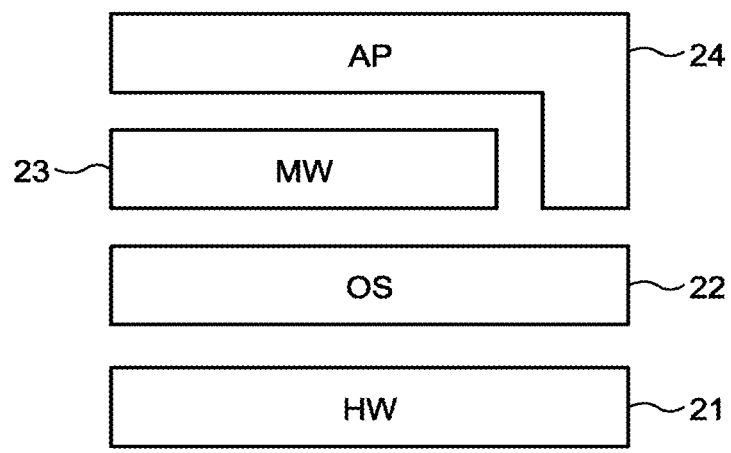
FIG. 22 is a diagram illustrating a configuration example of a program that operates in the computer.

FIG. 22 is a diagram illustrating a configuration example of a program that operates in the computer. In the computer 1, the OS 22 operates which executes control of a hardware (HW) 21 (301 to 312) illustrated in FIG. 22. The processor 301 operates in a procedure according to the OS 22 to execute control/management of the HW 21, and thus a process according to the AP 24 and the MW 23 is executed in the hardware group 21. Moreover, in the computer 1, the MW 23 or the AP 24 is read out by the RAM 302 to be executed by the processor 301.

When the encoding function is called, the processor 301 executes processes based on at least a part of the MW 23 and the AP 24, and (HW 21 on the basis of OS 22 to execute these processes) the function of the controller 110 is realized. When the retrieval function is called, the processor 301 executes processes based on at least a part of the MW 23 and the AP 24, and (HW 21 on the basis of OS 22 to execute these processes) the function of the controller 210 is realized. The encoding and retrieval functions may be included in the AP 24, or may be a part of the MW 23 that is called in accordance with the AP 24 so as to be executed.

Figure 23:
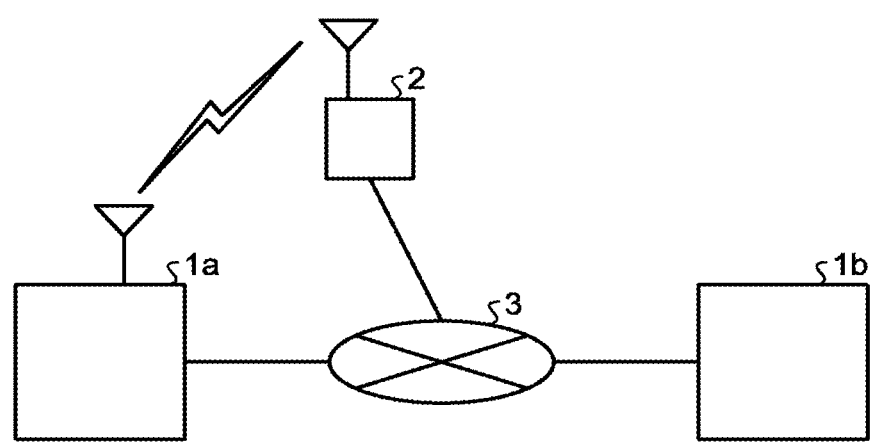
FIG. 23 is a diagram illustrating a configuration example of devices in the system according to the embodiment.

FIG. 23 is a diagram illustrating a configuration example of devices in the system according to the embodiment. The system illustrated in FIG. 23 includes a computer 1a, a computer 1b, a base station 2, and the network 3. The computer 1a is connected to the network 3 that is connected to the computer 1b in at least one of wireless and wired manners.

The encoding device 100 and the retrieval device 200 may be included in any of the computer 1a and the computer 1b illustrated in FIG. 23. The computer 1b may include functions of the encoding device 100 and the computer 1a may include functions of the retrieval device 200. The computer 1a may include functions of the encoding device 100 and the computer 1b may include functions of the retrieval device 200. Each of the computers 1a and 1b may include the functions of the encoding device 100 and the functions of the retrieval device 200.

According to one aspect of the embodiments, index information of a plurality of files can be easily updated in accordance with the update of any file without changing the size.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable recording medium having stored therein an encoding program that causes a computer to execute a process comprising:
   encoding a target file by using a static dictionary and a dynamic dictionary;
   generating index information of the target file by folding a file axis and a word axis of the index information of the target file utilizing base numbers, respectively, the index information indicating presence information of words registered in the static dictionary and the dynamic dictionary in the target file; and
   generating difference information of the index information when the target file is updated, the difference information indicating difference of the index information with respect to the file axis direction or the word axis direction;
   wherein the generating the difference information includes: generating, when the target file is added, update information of index information corresponding to the added file for the index information before the addition with respect to the file axis or the word axis; and changing the generated update information into hashed index information.

2. The computer readable recording medium according to claim 1,
   wherein the generating the index information further includes generating second index information by folding the file axis of second index information indicating presence information of the target file utilizing a specific base number, and the generating the difference information includes:
   generating, when the target file is deleted, deletion information of the second index information for the second index information before the deletion of the target file; and
   changing the generated deletion information into the second hashed index information.

3. The computer readable recording medium according to claim 1, wherein a size of each of the axes in the file axis and the word axis corresponds to a number of bits according to a size of a register.

4. An encoding method to be executed by a computer, the method comprising:
   encoding a target file by using a static dictionary and a dynamic dictionary using a processor;
   generating index information of the target file by folding a file axis and a word axis of the index information of the target file utilizing base numbers, respectively, the index information indicating presence information of words registered in the static dictionary and the dynamic dictionary in the target file using the processor; and
   generating difference information of the index information when the target file is updated, the difference information indicating difference of the index information with respect to the file axis direction or the word axis direction using the processor;
   wherein the generating the difference information includes: generating, when the target file is added, update information of index information corresponding to the added file for the index information before the addition with respect to the file axis or the word axis; and changing the generated update information into hashed index information.

5. An encoding device comprising:
a processor;

a memory, wherein the processor executes a process comprising:

encoding a target file by using a static dictionary and a dynamic dictionary;

generating index information of the target file by folding a file axis and a word axis of the index information of the target file utilizing base numbers, respectively, the index information indicating presence information of words registered in the static dictionary and the dynamic dictionary in the target file; and generating difference information of the index information when the target file is updated, the difference information indicating difference of the index information with respect to the file axis direction or the word axis direction;

wherein the generating the difference information includes: generating, when the target file is added, update information of index information corresponding to the added file for the index information before the addition with respect to the file axis or the word axis; and changing the generated update information into hashed index information.

\* \* \* \* \*